(12) United States Patent
Honda et al.

(10) Patent No.: US 7,144,974 B2
(45) Date of Patent: Dec. 5, 2006

(54) POLYESTER PRODUCTION METHOD, POLYESTER COMPOSITION, AND POLYESTER FIBER

(75) Inventors: Keisuke Honda, Kawasaki (JP); Kunihiro Morimoto, Mishima (JP); Masatoshi Aoyama, Mishima (JP); Tatsuya Nagano, Mishima (JP); Minoru Fujimori, Fuji (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 10/875,557

(22) Filed: Jun. 25, 2004

(65) Prior Publication Data
US 2004/0266978 A1 Dec. 30, 2004

(30) Foreign Application Priority Data
Jun. 26, 2003 (JP) .............................. 2003/182227

(51) Int. Cl.
*C08G 63/82* (2006.01)
*B32B 1/015* (2006.01)

(52) U.S. Cl. ...................... 528/279; 528/275; 528/280; 528/285; 528/286; 528/295; 528/302; 528/308; 528/308.6; 524/706; 524/710; 524/713; 524/783; 524/785; 524/81; 428/221; 428/364

(58) Field of Classification Search ................ 528/275, 528/279, 280, 285, 286, 295, 302, 308, 308.6; 524/706, 710, 713, 783, 785, 81; 428/221, 428/364
See application file for complete search history.

(56) References Cited

U.S. PATENT DOCUMENTS

| 6,489,433 B1 * | 12/2002 | Duan et al. ................. 528/272 |
| 2002/0165336 A1 | 11/2002 | Duan et al. ................. 528/272 |

FOREIGN PATENT DOCUMENTS

| GB | 1 284 658 | | 8/1972 |
| JP | 7-25994 | A | 1/1995 |
| JP | 10-259296 | A | 9/1998 |
| JP | 10259296 | * | 9/1998 |
| JP | 2002-293909 | A | 10/2002 |
| JP | 2003-40991 | A | 2/2003 |
| JP | 2003-40994 | A | 2/2003 |
| JP | 2003-147060 | A | 5/2003 |
| WO | 97/47675 | A1 | 12/1997 |
| WO | WO 97/47675 | * | 12/1997 |
| WO | 99/28033 | A1 | 6/1999 |
| WO | 99/54040 | A1 | 10/1999 |

OTHER PUBLICATIONS

Weingart, F. et al. "Titanium Catalysts in the Manufacture of Polyethylene Terephthalate", *Chemical Fibers International (CFI)*, vol. 46, Apr. 1996, pp. 96-97.

* cited by examiner

*Primary Examiner*—Samuel A. Acquah
(74) *Attorney, Agent, or Firm*—Kubovcik & Kubovcik

(57) ABSTRACT

In a polyester production method, a titanium compound having a radical selected from a carbonyl group, a carboxyl group, or an ester group, and a phosphorous compound having a structure illustrated in Formula (I), are added

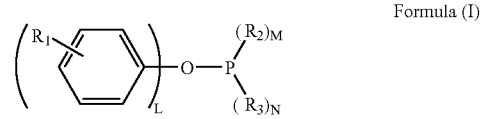

Formula (I)

This yields a polyester composition which does not exhibit increased filter pressure when forming, which has excellent filament and film forming properties, and which has a polymer color tone superb to that of conventional products.

10 Claims, No Drawings

POLYESTER PRODUCTION METHOD, POLYESTER COMPOSITION, AND POLYESTER FIBER

BACKGROUND OF THE INVENTION

1. Field of the Invention

The present invention relates to a polyester production method, a polyester composition, and a polyester fiber.

2. Description of the Related Art

Polyester is employed in a wide variety of uses due to the usefulness of the functions thereof, such as in clothing, material, medical, and other applications.

Generally, in the production of polyester, antimony compounds are widely used as a polymerization catalyst in industrial processes for manufacturing high-molecular-weight polymers. However, polymers containing antimony compounds have several undesirable properties, as follows.

For example, at the time of melt-spinning of polyester obtained with antimony compounds as a polymerization catalyst, there is residual antimony compound which accumulates around the spinneret. This accumulation of the residual antimony compound is thought to be due to the antimony compound being denaturized near the spinneret, of which a part vaporizes and dissipates, leaving a component which is primarily antimony at the spinneret. Progression of this accumulation leads to defective filament, and accordingly must be periodically removed.

Also, residual antimony compounds readily form relatively large pieces of foreign matter. This is undesirable since it can cause increased pressure at the filter in the forming process, thread breakage during spinning, film damage in formation of films, and so forth, and has been a factor in reduced operation capabilities. Due to such reasons, there is the need for a polyester containing little or no antimony.

An known example thereof is employing a germanium compound instead of an antimony compound as the polymerization catalyst, but there is little germanium deposited which can be mined and germanium is rare, so general-purpose application thereof is not practical.

Also, a technique for using titanium complexes formed of titanium compounds and phosphorous compounds as a polymerization catalyst are disclosed in PCT Japanese Translation Patent Publication No. 2001-524536, PCT Japanese Translation Patent Publication No. 2002-512267, Japanese Unexamined Patent Application Publication No. 2002-293909, Japanese Unexamined Patent Application Publication No. 2003-40991, and Japanese Unexamined Patent Application Publication No. 2003-40994. While this method allows the amount of pieces of foreign matter to be reduced, the color tone of the obtained polymer is not quite suitable for actual use.

Further, Japanese Unexamined Patent Application Publication No. 2003-147060 discloses a technique for producing a copolymerized polyester having phenylene dioxydiacetic acids as a copolymerization component, wherein polycondensation is carried out under the presence of a polymerization catalyst and an organic phosphite compound. However, this Publication makes no mention of the specific chemical structure of the titanium compound. Also, the only polymerization catalyst described in the Embodiments of this Publication is an antimony compound, and accordingly does not lead to solving the cause of increased pressure at the filter in the forming process, thread breakage during spinning, and film damage in formation of films.

SUMMARY OF THE INVENTION

The present invention has been made in light of the above-described problems of the conventional art, and accordingly, it is an object of the present invention to provide a polyester compound which does not lead to increased filter pressure at the time of formation, having excellent fiber and film formation properties, and having superb color tone of polymer over conventional products.

To this end, a first aspect of the present invention is a polyester production method wherein a titanium compound having a radical selected from a carbonyl group, a carboxyl group, or an ester group, and a phosphorous compound having a structure illustrated in Formula (I) are added;

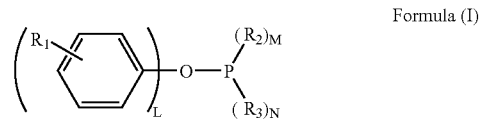

Formula (I)

in which $R_1$ represents hydrogen, a hydrocarbon radical comprising 1 to 50 carbon atoms, a hydroxyl group, or a hydrocarbon radical comprising 1 to 50 carbon atoms and including an alkoxy group, of which two or more may be included with regard to the benzene ring; $R_2$ and $R_3$ independently represent a hydrocarbon radical comprising 1 to 50 carbon atoms, a hydroxyl group, or a hydrocarbon radical comprising 1 to 50 carbon atoms and including an alkoxy group, and may be an alkoxy group of $-OR_2$ or $-OR_3$ as to the phosphorous atom; $L+M+N=3$ wherein L is an integer of 1 through 3, and M and N are integers between 0 and 2; and $R_2$ and $R_3$ may form a ring.

The titanium compound may include a radical selected from a group of functional groups represented by the following Formulas (II) through (VI);

$$-O-\underset{\underset{R_6}{|}}{\overset{\overset{R_4}{|}}{C}}-R_5 \qquad \text{Formula (II)}$$

$$-O-\underset{\underset{R_8}{|}}{\overset{\overset{\parallel}{C}}{CH}}-R_7 \qquad \text{Formula (III)}$$

$$-O-\!\!\!\left\langle\!\!\!\begin{array}{c}\\ \end{array}\!\!\!\right\rangle\!\!-R_9 \qquad \text{Formula (IV)}$$

$$-O-\underset{\overset{\parallel}{O}}{C}-R_{10} \qquad \text{Formula (V)}$$

$$-\underset{\underset{R_{12}}{|}}{N}-R_{11} \qquad \text{Formula (VI)}$$

in which $R_4$ through $R_{12}$ independently represent hydrogen, a hydrocarbon radical comprising 1 to 30 carbon atoms, or a hydrocarbon radical comprising 1 to 30 carbon atoms and including an alkoxy group, a hydroxyl group, a carbonyl group, an acetyl group, a carboxyl group, an ester group, or an amino group.

The titanium compound may include a radical selected from a group of functional groups represented by the Formulas (II) through (IV), in which $R_4$ through $R_9$ independently represent a hydrocarbon radical comprising 1 to 30 carbon atoms and including a carbonyl group, a carboxyl group, or an ester group.

The phosphorous compound may contain a six-membered ring structure or higher including phosphorous atoms, and further, the phosphorous compound may include that represented by Formula (VII);

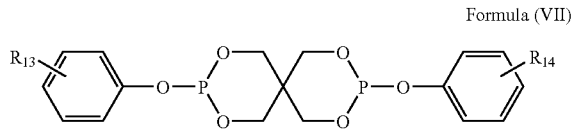

Formula (VII)

in which $R_{13}$ and $R_{14}$ independently correspond to $R_1$ in Formula (I).

0.5 to 150 ppm of titanium compound may added as to the amount of polyester to be generated, in terms of titanium atoms, or 0.1 to 400 ppm of phosphorous compound may added as to the amount of polyester to be generated, in terms of phosphorous atoms.

The ratio of addition of titanium compound and phosphorous compound may be 0.1 to 20 in terms of molecular ratio Ti/P of titanium atoms and phosphorous atoms. Also, 1 to 400 ppm of a manganese compound may be added as to the amount of polyester to be generated, in terms of manganese atoms, wherein the ratio of addition of manganese compound as to the phosphorous compound is 0.1 to 200 in terms of molecular ratio Mn/P of manganese atoms and phosphorous atoms. Further, a blue organic color adjusting agent and/or a red organic color adjusting agent may be added. Moreover, polymerized polyester which has then been depolymerized may be used as a material.

A polyester composition is produced by the polyester production method. The amount of antimony compound contained in the polyester composition may be 30 ppm or less in terms of antimony atoms as to the polyester.

A polyester fiber includes the polyester composition. The polyester composition may include 0.5 to 7.0% by weight of titanium dioxide particles.

The polyester of the polyester composition may be produced by copolymerization of 0.1 to 10 mol % of an isophthalic acid component containing a metal sulfonate radical and 0.1 to 5.0% by weight of a polyoxy alkylene glycol component having a number average molecular weight of 400 to 6000. This polyester composition may include 0.5 to 7.0% by weight of titanium dioxide particles.

An industrial polyester fiber includes the polyester composition, wherein the intrinsic viscosity of the polyester is 0.85 or higher, the toughness $T \cdot E^{1/2}$, defined by the product of the strength T(cN/dtex) and the square root of the elongation E(%) of the fiber, is 28 or higher, and the dimensional stability represented by the sum of intermediate elongation and dry-heat shrinkage is 12% or lower.

A polyester fiber for sewing machine thread includes the polyester composition, wherein the strength is 7.1 to 8.5 cN/dtex and elongation is 14 to 24%.

A polyester nonwoven fabric includes the polyester composition, wherein the polyester is produced by copolymerization of 0.1 to 20 mol % of an isophthalic acid component.

According to the present invention, a polyester can be produced which does not lead to increased filter pressure at the time of forming, having excellent fiber and film formation properties, and having superb color tone of polymer over conventional products.

DESCRIPTION OF THE PREFERRED EMBODIMENTS

Polyester is a polymer synthesized from dicarboxylic acid or an ester-forming derivative thereof and diol or an ester-forming derivative thereof. The polyester produced according to the present invention is preferably used in formed articles such as fabrics, films, bottles, and so forth.

Examples of such polyester include polyethylene terephthalate, polytrimethylene terephthalate, polytetramethylene terephthalate, polycyclohexylene dimethylene terephthalate, polyethylene-2,6-naphthalene dicarboxylate, polyethylene-1,2-bis(2-chlorophenoxy)ethane-4,4'-dicarboxylate, and so forth.

Also, compounds which may be copolymerized with these polyesters as a copolymerization component other than diethylene glycol are: adipic acid, isophthalic acid, sebacic acid, phthalic acid, naphthalene dicarboxylic acid, 4,4'-diphenyl dicarboxylic acid, cyclohexane dicarboxylic acid and like dicarboxylic acids and ester-forming derivatives thereof; and polyethylene glycol, hexamethylene glycol, neopentyl glycol, polypropylene glycol, cyclohexane dimethanol and like dioxy compounds; p-(β-oxyethoxy) benzoate and like oxycarboxylates and ester-forming derivatives thereof.

The polyester production method according to the present invention is suitable for producing polyethylene terephthalate which is the most commonly and widely used form, or polyester copolymers including primarily ethylene terephthalate units.

The polyester production method according to the present invention employs a titanium compound as a polymerization catalyst, since employing a titanium compound as a polyerization catalyst instead of an antimony compound suppresses residue and foreign matter originating from the antimony compound.

The polymerization catalyst in producing the polyester contributes to promoting a part of the elementary reactions described in the following (1) through (3) or all reactions, in the process wherein polyester is synthesized from dicarboxylic acid or an ester-forming derivative thereof and diol or an ester-forming derivative thereof.

(1) Esterification reaction, which is reaction between the dicarboxylic acid component and the diol component.
(2) Ester interchange reaction, which is, reaction between the ester-forming derivative of the dicarboxylic acid component and the diol component.
(3) Polycondensation, wherein a low polymer obtained by the reaction (1) or (2) is high-polymerized by removing the diol component out of the reaction system.

It is crucial with the present invention that the titanium compound used as the polymerization catalyst have a radical selected from a carbonyl group, a carboxyl group, or an ester group, since using employing such a titanium compound enables the color tone of the polyester to be polymerized with the titanium compound to be improved.

It should be noted that catalysts such as conventionally-known tetraisopropoxy titanium and tetrabuthoxy titanium do not contain the carbonyl group, carboxyl group, or ester group.

As for a titanium compound having a radical selected from a carbonyl group, a carboxyl group, or an ester group, one including a radical selected from a group of functional groups represented by the following Formulas (II) through (VI) is preferably employed.

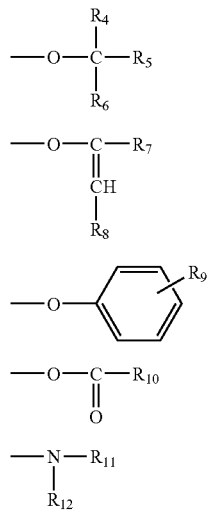

Formula (II)

Formula (III)

Formula (IV)

Formula (V)

Formula (VI)

In Formulas (II) through (VI), $R_4$ through $R_{12}$ independently, represent hydrogen, a hydrocarbon radical comprising 1 to 30 carbon atoms, or a hydrocarbon radical comprising 1 to 30 carbon atoms and including an alkoxy group, a hydroxyl group, a carbonyl group, an acetyl group, a carboxyl group, an ester group, or an amino group.

Of these, those having radicals selected from functional groups indicated by Formula (II) and Formula (V) are preferable from the perspective of thermal stability of the polymer and color tone thereof.

Also, those having radicals selected from functional groups indicated by Formula (II) through Formula (IV) are preferable from the perspective of ease of synthesis. Here, $R_4$ through $R_9$ independently represent a hydrocarbon radical comprising 1 to 30 carbon atoms and including a carbonyl group, a carboxyl group, or an ester group.

Examples of the functional group indicated by Formula (II) include hydroxy polyvalent carboxylic compounds such as lactic acid, malic acid, tartaric acid, citric acid, and so forth.

Examples of the functional group indicated by Formula (III) include acetyl acetone and like β-diketone compounds, methyl acetoacetate, ethyl acetoacetate, and like ketoester compounds.

Examples of the functional group indicated by Formula (IV) include those of phenoxy, cresylate, salicyl, and the like.

Examples of the functional group indicated by Formula (V) include acylate groups such as lactate, stearate, and so forth; polyvalent carboxylic acid compounds such as phthalic acid, trimellitic acid, trimesic acid, hemimellitic acid, pyromellitic acid, oxalic acid, malonic acid, succinic acid, glutaric acid, adipic acid, sebacic acid, maleic acid, fumaric acid, cyclohexane dicarboxylic acid, or anhydrates thereof; and nitrogenous polyvalent carboxylic acid compounds such as ethylene diamine tetra-acetic acid, nitrilo tripropionic acid, carboxy iminodiacetic acid, carboxymethyl iminobipropionic acid, diethylenetriamino pentaacetic acid, triethylenetetramino hexaacetic acid, iminodiacetic acid, iminobipropionic acid, hydroxyethyl iminodiacetic acid, hydroxyethyl iminobipropionic acid, methoxyethyl iminodiacetic acid, and so forth.

Examples of the functional group indicated by Formula (VI) include aniline, phenylamine, diphenylamine, and so forth.

Also, titanium compounds containing two or more substituents of Formula (II) through Formula (VI) are preferable, examples thereof being titanium isopropoxy bis-acetylacetonate including the functional group of Formula (II) and Formula (III), titanium triethanolaminate isopropoxide including the functional group of Formula (II) and Formula (VI), and so forth.

Note that titanium dioxide particles, which are commonly used as a delustering agent for fabrics essentially have no catalytic effects, and are to be distinguished from titanium compounds used as polymerization catalysts.

The amount of titanium compound (excluding titanium dioxide particles) used is preferably 0.5 to 150 ppm in terms of titanium atoms as to the amount of polyester to be generate, more preferably 1 to 100 ppm, and even more preferably 3 to 50 ppm. Inclusion of 0.5 ppm or more yields the actual effects as a polymerization catalyst, and 150 ppm or less yields excellent thermal stability and color tone of the polyester produced.

Also, with the polyester producing method according to the present invention, it is crucial that the phosphorous compound illustrated in Formula (I) is added along with the titanium compound.

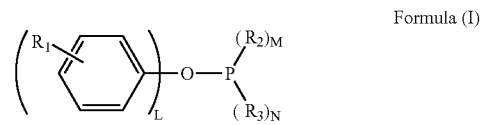

Formula (I)

Here, $R_1$ represents hydrogen, a hydrocarbon radical comprising 1 to 50 carbon atoms, a hydroxyl group, or a hydrocarbon radical comprising 1 to 50 carbon atoms and including an alkoxy group, of which two or more may be included with regard to the benzene ring. In this case, the hydrocarbon radical may include an alicyclic structure such as cyclohexyl, or the like, an aliphatic branch structure, or an aromatic ring structure such as phenyl or naphthyl or the like. $R_2$ and $R_3$ independently represent a hydrocarbon radical comprising 1 to 50 carbon atoms, a hydroxyl group, or a hydrocarbon radical comprising 1 to 50 carbon atoms and including an alkoxy group, and may be an alkoxy group of $-OR_2$ or $-OR_3$ as to the phosphorous atom. Here, the hydrocarbon radical may include an alicyclic structure such as cyclohexyl, or the like, an aliphatic branch structure, or an aromatic ring structure such as phenyl or naphthyl or the like. Also, L+M+N=3 holds, wherein L is an integer of 1 through 3, and M and N are integers between 0 and 2. Moreover, $R_2$ and $R_3$ may form a ring structure.

Adding the phosphorous compound of Formula (I) yields the effects of improved color tone and thermal stability of the polymer produced, and this phosphorous compound is further advantageous among phosphorous compounds that polymerization is not delayed.

Examples of the phosphorous compound of Formula (I) include ester phosphite, diallyl phosphinous alkyl, diallyl phosphinous allyl, allyl phosphonous dialkyl, allyl phosphonous diallyl, and so forth, and ester phosphite is particularly preferable from the perspective of thermal stability and color tone improvement.

As for ester phosphites not having a ring structure, examples wherein L=3, M=0, and N=0 in formula (I) include triphenyl phosphite, tris(4-monononyl phenyl) phosphite, tri(monononyl/dinonyl phenyl) phosphite, tris(2,4-tert-butyl phenyl) phosphite indicated by Formula (VIII), and so forth.

Formula (VIII)

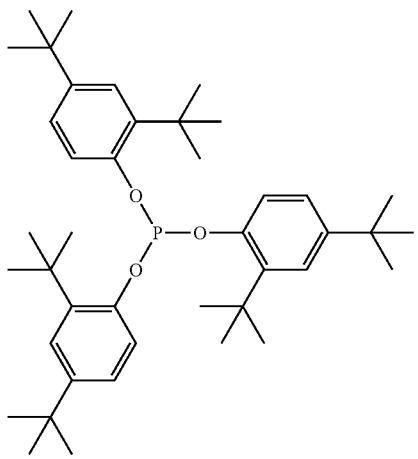

Examples wherein L=2, M=1, and N=0 include monooctyldiphynyl phosphite, monodecyldiphynyl phosphite, bis[2,4-bis(1,1-dimethylethtyl)-6-methylphenyl] ethylphosphite, tetrakis(2,4-di-tert-butylphenyl)4,4'-biphenylene diphosphite. Examples wherein L=1, M=1, and N=1 include dioctylmonophenyl phosphite, didecylmonophenyl phosphite, and so forth.

Of these, the tris(2,4-tert-butyl phenyl) phosphite indicated by Formula (VIII) is particularly preferable. This compound can be obtained as ADEKASTAB 2112 (manufactured by Asahi Denka Co., Ltd.) or as IRGAFOS168 (manufactured by Ciba Specialty Chemicals).

The phosphorous compound of Formula (I) preferably has a six-membered ring structure or higher including phosphorous atoms, from the perspective of thermal stability and color tone improvement.

As for ester phosphites having a six-membered ring structure or higher, examples wherein L=1, M=1, and N=1 include bis(2,6-di-tert-butyl-4-methylphenyl) pentaerithritol-di-phosphite indicated by Formula (IX), Formula (IX)

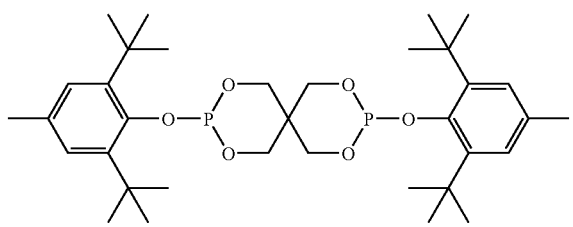

bis(2,4-di-tert-butylphenyl) pentaerithritol-di-phosphite indicated by Formula (X), Formula (X)

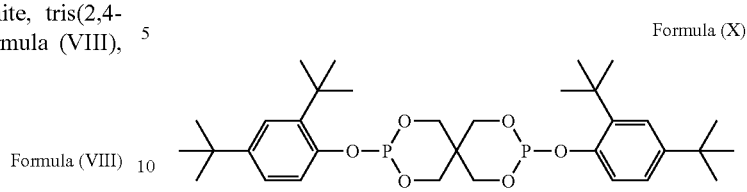

and 3,9-bis(2,4-dicumylphenoxy)-2,4,8,10-tetraoxa-3,9-diphosphaspiro [5,5] undecane, phenyl-neopentyleneglycol-phosphite, and so forth.

Examples wherein L=2, M=1, and N=0 include the 2,2-methylene bis(4,6-di-tert-butylphenyl) octylphosphite indicated by Formula (XI), and so forth.

Formula (XI)

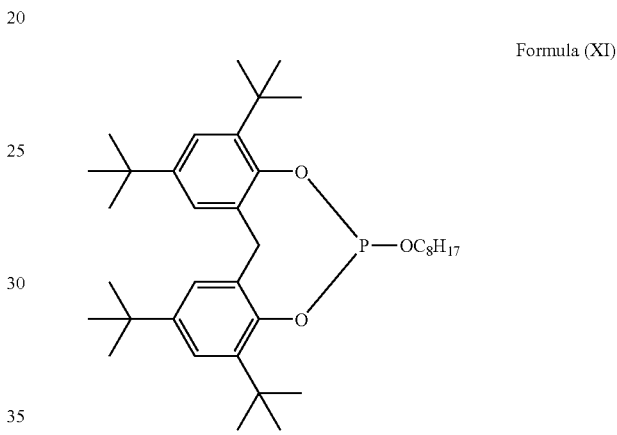

Particularly, that of Formula (VII), such as the bis(2,6-di-tert-butyl-4-methylphenyl) pentaerithritol-di-phosphite of Formula (IX), the bis(2,4-di-tert-butyphenyl) pentaerithritol-di-phosphite of Formula (X), and so forth, are preferable from the perspective of thermal stability and color tone improvement.

Formula (VII)

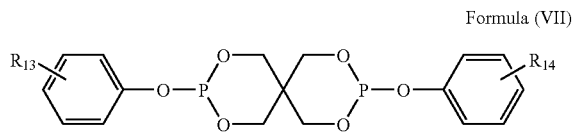

In Formula (VII), $R_{13}$ and $R_{14}$ independently correspond to $R_1$ in Formula (I).

Moreover, the 2,2-methylene bis(4,6-di-tert-butylphenyl) octylphosphite of Formula (XI) is also preferable.

The bis(2,6-di-tert-butyl-4-methylphenyl), pentaerithritol-di-phosphite of Formula (IX) can be obtained as ADEKASTAB PEP-36 (manufactured by Asahi Denka Co., Ltd.).

The bis(2,4-di-tert-butylphenyl) pentaerithritol-di-phosphite of Formula (X) can be obtained as ADEKASTAB PEP-24G (manufactured by Asahi Denka Co., Ltd.), or as IRGAFOS126 (manufactured by Ciba Specialty Chemicals).

The 2,2-methylene bis(4,6-di-tert-butylphenyl) octylphosphite of Formula (XI) can be obtained as ADEKASTAB HP-10 (manufactured by Asahi Denka Co., Ltd.).

Any one type of these phosphorous compounds may be used independently, or may be used along with other phosphorous compounds.

Further, phosphorous compounds other than the phosphorous compound of Formula (I) may be used as well. Examples of such phosphorous compounds which can be used include phosphoric acids, phosphorous acids, phosphonic acids, phosphinic acids, phosphin oxides, phosphonous acids, phosphinous acids, phosphines, and so forth.

Examples of phosphoric acids include phosphoric acid, trimethyl phosphate, triethyl phosphate, triphenyl phosphate, and so forth.

Examples of phosphorous acids include phosphorous acid, trimethyl phosphite, triethyl phosphite, triphenyl phosphite, and so forth.

Examples of phosphonic acids include methylphosphonic acid, ethylphosphonic acid, propylphosphonic acid, isopropylphosphonic acid, butylphosphonic acid, phenylphosphonic acid, benzylphosphonic acid, tolylphosphonic acid, xylylphosphonic acid, biphenylphosphonic acid, naphtylphosphonic acid, anthrylphosphonic acid, 2-carboxyphenylphosphonic acid, 3-carboxyphenylphosphonic acid, 4-carboxyphenylphosphonic acid, 2,3-dicarboxyphenylphosphonic acid, 2,4-dicarboxyphenylphosphonic acid, 2,5-dicarboxyphenylphosphonic acid, 2,6-dicarboxyphenylphosphonic acid, 3,4-dicarboxyphenylphosphonic acid, 3,5-dicarboxyphenylphosphonic acid, 2,3,4-tricarboxyphenylphosphonic acid, 2,3,5-tricarboxyphenylphosphonic acid, 2.3.6-tricarboxyphenylphosphonic acid, 2,4,5-tricarboxyphenylphosphonic acid, 2,4,6-tricarboxyphenylphosphonic acid, dimethylester methylphosphonate, diethylester methylphosphonate, dimethylester ethylphosphonate, diethylester ethylphosphonate, dimethylester phenylphosphonate, diethylester phenylphosphonate, diphenylester phenylphosphonate, dimethylester benzylphosphonate, diethylester benzylphosphonate, diphenylester benzylphosphonate, lithium (3,5-di-tert-butyl-4-ethyl hydroxybenzylphosphonate), sodium (3,5-di-tert-butyl-4-ethyl hydroxybenzylphosphonate), magnesium bis(3,5-di-tert-butyl-4-ethyl hydroxybenzylphosphonate), calcium bis(3,5-di-tert-butyl-4-ethyl hydroxybenzylphosphonate), diethyl phosphonoacetate, methyl diethylphosphonoacetate, ethyl diethylphosphonoacetate, and so forth.

Examples of phosphinic acids include hypophosphorous acid, sodium hypophosphite, methylphosphinic acid, ethylphosphinic acid, propylphosphinic acid, isopropylphosphinic acid, butylphosphinic acid, phenylphosphinic acid, tolylphosphinic acid, xylylphosphinic acid, biphenylylphosphinic acid, diphenylphosphinic acid, dimethylphosphinic acid, diethylphosphinic acid, dipropylphosphinic acid, diisopropylphosphinic acid, dibutylphosphinic acid, ditolylphosphinic acid, dixylylphosphinic acid, dibiphenylylphosphinic acid, naphtylphosphinic acid, anthrylphosphinic acid, 2-carboxyphenylphosphinic acid, 3-carboxyphenylphosphinic acid, 4-carboxyphenylphosphinic acid, 2,3-dicarboxyphenylphosphinic acid, 2,4-dicarboxyphenylphosphinic acid, 2,5-dicarboxyphenylphosphinic acid, 2,6-dicarboxyphenylphosphinic acid, 3,4-dicarboxyphenylphosphinic acid, 3,5-dicarboxyphenylphosphinic acid, 2,3,4-tricarboxyphenylphosphinic acid, 2,3,5-tricarboxyphenylphosphinic acid, 2,3,6-tricarboxyphenylphosphinic acid, 2,4,5-tricarboxyphenylphosphinic acid, 2,4,6-tricarboxyphenylphosphinic acid, bis(2-carboxyphenyl) phosphinic acid, bis(3-carboxyphenyl) phosphinic acid, bis(4-carboxyphenyl) phosphinic acid, bis(2,3-dicarboxyphenyl) phosphinic acid, bis(2,4-dicarboxyphenyl) phosphinic acid, bis(2,5-dicarboxyphenyl) phosphinic acid, bis(2,6-dicarboxyphenyl) phosphinic acid, bis(3,4-dicarboxyphenyl) phosphinic acid, bis(3,5-dicarboxyphenyl) phosphinic acid, bis(2,3,4-tricarboxyphenyl) phosphinic acid, bis(2,3,5-tricarboxyphenyl) phosphinic acid, bis(2,3,6 -tricarboxyphenyl) phosphinic acid, bis(2,4,5-tricarboxyphenyl) phosphinic acid, bis(2,4,6-tricarboxyphenyl) phosphinic acid, methylester methylphosphinate, methylester dimethylphosphinate, ethylester methylphosphinate, ethylester dimethylphosphinate, methylester ethylphosphinate, methylester diethylphosphinate, ethylester ethylphosphinate, ethylester diethylphosphinate, methylester phenylphosphinate, ethylester phenylphosphinate, phenylester phenylphosphinate, methylester diphenylphosphinate, ethylester diphenylphosphinate, phenylester diphenylphosphinate, methylester benzylphosphinate, ethylester benzylphosphinate, phenylester benzylphosphinate, bis-methylester benzylphosphinate, bis-ethylester benzylphosphinate, bis-phenylester benzylphosphinate, and so forth.

Examples of phosphin oxides include trimethylphosphinoxide, triethylphosphin oxide, tripropylphosphin oxide, triisopropylphosphin oxide, tributylphosphin oxide, triphenylphosphin oxide, and so forth.

Examples of phosphonous acids include methylphosphonous acid, ethylphosphonous acid, propylphosphonous acid, isopropylphosphonous acid, butylphosphonous acid, phenylphosphonous acid, and so forth.

Examples of phosphinous acids include methylphosphinous acid, ethylphosphinous acid, propylphosphinous acid, isopropylphosphinous acid, butylphosphinous acid, phenylphosphinous acid, dimethylphosphinous acid, diethylphosphinous acid, dipropylphosphinous acid, diisopropylphosphinous acid, dibutylphosphinous acid, diphenylphosphinous acid, and so forth.

Examples of phosphines include methylphosphine, dimethylphosphine, trimethylphosphine, ethylphosphine, diethylphosphine, triethylphosphine, phenylphosphine, diphenylphosphine, triphenylphosphine, and so forth.

The amount of phosphorous compound added is preferably 0.1 to 400 ppm in terms of phosphorous atoms as to the amount of polyester to be generated, more preferably 1 to 200 ppm, and even more preferably 3 to 100 ppm. Inclusion of 0.1 ppm or more yields the actual effects of thermal stability and color tone of the polyester produced, and 400 ppm or less prevents delay of polymerization.

The ratio of addition of titanium compound and phosphorous compound is preferably 0.1 to 20 in terms of molecular ratio Ti/P of titanium atoms and phosphorous atoms, more preferably 0.2 to 10, and even more preferably 0.3 to 5. 0.1 or greater improves polymerization effectiveness, and 20 or less yields excellent thermal stability and color tone of the polyester produced.

Also preferable is adding a manganese compound 1 to 400 ppm in terms of manganese atoms as to the amount of polyester to be generated, with the molecular ratio Mn/P of the manganese atoms of the manganese compound and phosphorous atoms of the phosphorous compound of 0.1 to 200. Manganese atoms of 1 ppm or more with a molecular ratio Mn/P of 0.1 or more allows deterioration of polymerization activity to be suppressed, and also, keeping the manganese atoms to 400 ppm or lower with a molecular ratio Mn/P of 200 or less enables the advantages of improving the color tone of the polymer due to the phosphorous compound to be maintained. Examples of the manganese compound include manganese chloride, manganese bromide, manganese nitrate, manganese carbonate, manganese acetylacetonate, manganese acetate tetrahydrate, manganese acetate dihydrate, and so forth.

Other polymerization catalysts or polymerization assistants which can be added include alkali metal compounds such as lithium compounds, alkaline-earth metal compounds such as calcium compounds, magnesium compounds and so forth, or aluminum compounds, zinc compounds, tin compounds, and so forth.

As for a method of obtaining a titanium compound which can be used as a polymerization compound, a polymerization catalyst can be synthesized by mixing a titanium alcoxide compound to serve as the center of the polymerization with a compound having a radial selected from the group of functional groups of Formulas 2 through 6 described earlier (hereafter referred to as "ligand compound").

Examples of the titanium alcoxide compound to be used include titanium tetraisopropoxide and titanium tetrabutoxide.

As a method for synthesizing a polymerization catalyst by mixing the titanium alcoxide compound and the ligand compound, a concentrate or diluted solution of the ligand compound can be delivered by drops into a solution of the titanium alcoxide compound, to carry out the reaction.

Or, a concentrate or diluted solution of the titanium alcoxide compound can be delivered by drops into a solution of the ligand compound, and mixed to carry out the reaction.

Also, a phosphorous compound may be mixed beforehand into the solution into which the other compound is to be delivered by drops, or, a concentrate or diluted solution of the phosphorous compound can be delivered by drops.

Examples of a solvent used for synthesizing the polymerization catalyst include water, methanol, ethanol, ethylene glycol, propanediol, butanediol, benzene, xylene, and so forth, one of which may be used independently, or multiple kinds may be used together.

Also, adding the phosphorous compound at the point of synthesizing the titanium compound used as the polymerization catalyst is also preferable. In this case, preparation is preferably made in a solvent of pH 4 to 6, and hydrochloric acid, sulfuric acid, nitric acid, p-toluenephosphonic acid, and like acid compounds, MES (pH of 5.6 to 6.8), ADA (pH of 5.6 to 7.5), and like Good's buffers, and so forth.

As for the reaction temperature and reaction time for the reaction for synthesizing the polymerization catalyst, 1 minute or longer at 0 to 200° C. is preferable, and more preferable is 2 to 100 minutes at 20 to 100° C.

Further, carrying out the reaction while stirring is also preferable, and in this case 1 minute or longer at 0 to 200° C. is preferable, and more preferable is 2 to 60 minutes at 10 to 100° C.

There are no restrictions on the reaction pressure of the reaction for synthesizing the polymerization catalyst, i.e., room pressure is sufficient.

As described earlier, the polyester production process can be divided into the three of (1) esterification reaction,
(2) ester interchange reaction, and
(3) polycondensation, wherein a low polymer obtained by the reaction (1) or (2) is high-polymerized.

While esterification reaction will proceed without a catalyst, a titanium compound is preferably added as a catalyst from the perspective of promoting reaction.

With ester interchange reaction, a manganese compound, calcium compound, magnesium compound, zinc compound, lithium compound, or the like, or a titanium compound is preferably used as a catalyst to carry out the reaction. Also, after the ester interchange reaction has essentially ended, a phosphorous compound is preferably added to deactivate the catalyst used for the reaction.

With polycondensation reaction, using a titanium compound having a radical selected from a carbonyl group, carboxyl group, or ester group, as a catalyst as descried above, is preferable from the perspective of achieving the object of the present invention, which is a substitute for an antimony compound.

The polymerization catalyst of the titanium compound produced as described above is added into the polyester reaction system either with the solvent for synthesizing the catalyst remaining or removed, but an arrangement wherein a solution or slurry using a solvent including polyester diols such as ethylene glycol or propylene glycol or the like has the low-boiling-point components such as alcohol and so forth removed and then added to the reaction system is preferable, since formation of foreign matter in the polymer can be suppressed even further.

Further, additional adding of a phosphorous compound is preferable form the perspective of thermal stability and improved color tone. For this, there are methods for suppressing deactivation such as additional addition in a different reaction vat, setting a 1 to 15 minute interval between addition of the polymerization catalyst and the phosphorous compound in the same reaction vat, and distancing the positions for adding the two one from another.

In the event of adding the phosphorous compound at this stage, the phosphorous compound is preferably dissolved or dispersed in a diol component of ethylene glycol or the like in a slurry.

Also preferably is adding, at an optional timing in the above-reaction, particles such as titanium dioxide, silicon oxide, calcium carbonate, silicon nitride, clay, talc, kaolin, Carbon Black, etc., cobalt compounds, coloration inhibitors, stabilizers, phenol antioxidants, and so forth.

Examples of cobalt compounds include cobalt chloride, cobalt nitrate, cobalt carbonate, cobalt acetylacetonate, cobalt naphthenate, cobalt acetate tetrahydrate, and so forth.

Also, an organic color tone adjusting agent is preferably added at an optional point in the above reaction, or after the polycondensation reaction has essentially ended. A color tone adjusting agent is a dye used for resins and the like. Adding a color tone adjusting agent suppresses the yellow color of the polyester, and enables a color tone to be provided which is desired by users. Also, adding the color tone adjusting agent at the stage of producing the polyester composition allows for a color tone suitable for lightly-colored dyeing as well.

Specific examples of organic color tone adjusting agents by Color Index Generic Name are as follows. For blues, there are Solvent Blue 104, Solvent Blue 122, Solvent Blue 45, and so forth, for reds, Solvent Red 111, Solvent Red 179, Solvent Red 195, Solvent Red 135, Pigment Red 263, Vat Red 41, and so forth, and for violets, there are Disperse Violet 26, Solvent Violet 13, Solvent Violet 37, Solvent Violet 49, and so forth. Of these, organic color tone adjusting agents which do not contain halogens which readily become a factor for device corrosion, have relatively excellent thermal resistance at high temperatures, and have excellent coloration are preferable, Solvent Blue 104, Solvent Blue 45, Solvent Red 179, Solvent Red 195, Solvent Red 135, and Solvent Violet 49 meeting these conditions.

One or multiple types of these color tone adjusting agents can be used according to application or the demands of the user. Particularly, including a blue color tone adjusting agent and/or a red color tone adjusting agent is preferable since color tone can be adjusted finely. Here, the term "and/or"

means that only one of the two, or both, may be used. In this case, in the event that the ratio of blue color tone adjusting agent is 50% by weight or more of the entire amount of organic color tone adjusting agent used in the stage of producing the polyester composition, the color tone of the obtained polyester is particularly excellent, and accordingly is preferable.

As for the amount of adding the organic color tone adjusting agent, 30 ppm or less as to the polyester is preferable, since this maintains the transparency of the polyester, and suppresses matte coloration. In the event of using the following master chip, the amount of addition to the total amount of polyester following blending should be considered.

Methods for adding the organic color tone adjusting agent following polycondensation reaction include a method for direct melt kneading using a uniaxial or biaxial extruder, and a method for preparing polyester having the color tone adjusting agent at a high concentration as a master chip beforehand and separately blending the master chip with a chip not containing the color tone adjusting agent so as to adjust the color.

Also, as for the type of process for producing the polyester according to the present invention, batch, semi-batch, or flow models, or the like, may be applied.

Also preferable for the polyester producing method according to the present invention is to use a material which has been polymerized as polyester once and then depolymerized. Sources for the once-polymerized polyester include, for example, fiber, film, bottles, and so forth. For example, chemical recycling methods for depolymerizing polyethylene terephthalate include a method wherein the polyethylene terephthalate is depolymerized with ethylene glycol to yield bis(2-hydroxyethyl)terephthalate, which is then refined, a method wherein the bis(2-hydroxyethyl) terephthalate obtained by depolymerization is subjected to ester interchange reaction with methanol, and the obtained crude dimethyl terephthalate is refined by recrystallizing or distilling, thereby obtaining dimethyl terephthalate, and further a method wherein the dimethyl terephthalate is subjected to hydrolysis under high temperature and pressure, thereby obtaining terephthalic acid. Applying the present invention in the process of performing repolymerization using the bis(2-hydroxyethyl)terephthalate, dimethyl terephthalate, and terephthalic acid, obtained by depolymerizing once-polymerized polyester, allows a polymer with a color tone superb to that of conventional produces to be obtained, with no formation of foreign matter due to antimony compounds, and with excellent fiber and film formation properties.

The polyester composition according to the present invention is produced with the polyester production method according to the present invention.

The polyester composition according to the present invention preferably has 30 ppm or less of an antimony compound included as to the polyester, more preferably 10 ppm or less, and even more preferably none at all. Keeping the amount of antimony compound included to 30 ppm or less enables soiling of the spinneret during spinning and so forth to be reduced. Also, a relatively inexpensive polymer can be obtained.

The polyester resin according to the present invention contains the polyester composition according to the present invention, whereby a fiber with excellent color tone can be obtained.

Examples of the fiber-forming polyester include polyethylene terephthalate, polytrimethylene terephthalate, polytetramethylene terephthalate, and so forth. For clothing in particular, primarily using polyethylene terephthalate, which is highly versatile, is preferable.

Also, the polyester fiber according to the present invention may be compound or blend spun, assuming that the fiber includes the polyester composition according to the present invention. Examples of compound fibers include core-sheath, core-sheath hollow, island-in-sea, composite, and so forth.

Including at least 3% by weight of the polyester composition according to the present invention as to the polyester fiber according to the present invention is preferable in yielding the effects of the present invention.

As one form of polyester fiber according to the present invention, including 0.5 to 0.7% by weight of titanium dioxide particles is preferable. Including titanium dioxide particles within this range, which is a relatively large amount, provides the polyester fiber with a sensation of dryness and with light-shielding properties. Also, the sensation of dryness can be manifested by coarsening the surface of the fiber by alkali processing or the like. Also, as described above, the polyester composition according to the present invention is suitable for this form containing a great amount of titanium dioxide particles, since the formation of foreign matter near the spinneret owing to antimony compounds can be suppressed and fiber forming properties can be improved.

As for the size of the titanium dioxide particles which the polyester fiber according to the present invention is to include, an average secondary particle size of 1.0 µm or less, and an integration percentage of particles 2.0 µm or greater in frequency distribution of 5% or less, are preferable from the point of reducing friction against guides and the like in the process of passing the yarn.

Also, the polyester fiber according to the present invention includes the polyester composition according to the present invention, and the polyester is preferably copolymerized with 0.1 to 10 mol % of an isophthalic acid component having a metal sulfonate group, and 0.1 to 5.0% by weight of a polyoxy alkylene glycol component having a number average molecular weight of 400 to 6000.

The isophthalic acid component having the metal sulfonate group serves as a dyeing seat for kation dye, yielding bright coloration which cannot be realized with disperse dyes. Also, the copolymerization of polyoxy alkylene glycol enables suppression of increasing melting viscosity of the polymer due to copolymerization with the isophthalic acid component having the metal sulfonate group. Conventionally, with these copolymerization component combinations, deterioration in spinning properties due to formation of foreign matter at the spinneret was marked, but the polyester composition according to the present invention allows formation of foreign matter near the spinneret owing to antimony compounds to be suppressed and spinning properties can be improved. Accordingly, the polyester composition according to the present invention is suitable for this form wherein a third component is copolymerized.

Examples of isophthalic acid component having a metal sulfonate group include alkali metal salts of sulfoisophthalic acid such as 5-sodiumsulfoisophthalic acid, 5-lithiumsulfoisophthalic acid; ester-forming derivatives of alkali metal salts of sulfoisophthalic acid such as dimethyl 5-sodiumsulfoisophthalate, dimethyl 5-lithiumsulfoisophthalate, 5-sodiumsulfo-bis(2-hydroxyethyl)isophthalate, and 5-lithiumsulfo-bis(2-hydroxyethyl)isophthalate; phosphonium salts of sulfoisophthalic acid such as 5-(tetraethyl)phosphoniumsulfoisophthalic acid and 5-(tetrabutyl)phosphoniumsulfoisophthalic acid; and ester-forming derivatives of phosphonium salts of sulfoisophthalic acid such as dimethyl 5-(tetraethyl) phosphoniumsulfoisophthalate, dimethyl 5-(tetrabutyl) phosphoniumsulfoisophthalate, 5-(tetraethyl) phosphoniumsulfo-bis(2-hydroxyethyl)isophthalate, 5-(tetrabutyl)phosphoniumsulfo-bis(2-hydroxyethyl)isophthalate, and so forth. Of these, dimethyl 5-sodiumsulfoisophthalate and 5-sodiumsulfo-bis(2-hydroxyethyl)isophthalate are preferable from the point of dyeing properties.

Arranging the copolymerization amount of the isophthalic acid component having the metal sulfonate group so as to be 0.1 mol % or more yields excellent dyeing properties, and keeping this to 10 mol % or less suppresses increase of viscosity when molten, thereby suppressing the increased pressure at the filter to within a permissible range. A range of 0.6 to 5 mol % is more preferable, and 1.0 to 2.0 mol % is even more preferable.

Examples of the polyoxy alkylene glycol component include polyethylene glycol, polypropylene glycol, polybutylene glycol and so forth, and of these, polyethylene glycol, which is highly versatile, is preferable.

For the polyoxy alkylene glycol, a number average molecular weight of 400 or more yields excellent dyeing properties, and 6000 or less prevents lumps from forming in the polyester. 2000 to 5000 is even more preferable.

Arranging for the amount of copolymerization of the polyoxy alkylene glycol to be 0.1% by weight or more allows excellent dyeing properties to be obtained, and 5.0% by weight or less allows excellent heat resistance and polymer color tone to be maintained. 0.5 to 2.0% by weight is even more preferable.

Examples of the kation dye for dyeing the polyester fiber of this form include the product groups Aizen Cathilon (manufactured by Hodogaya Chemical Co, Ltd.), Kayacryl (manufactured by Nippon Kayaku Co., Ltd.), Estrol and Sumiacryl (manufactured by Sumitomo Chemical Co, Ltd.), Diacryl (manufactured by Mitsubishi Chemical Corporation), Maxilon (manufactured by Ciba-Geigy), Astrazon (manufactured by Bayer Japan), and so forth. Disperse kation dyes may be used as well.

Also, the polyester fiber according to the present invention contains the polyester composition according to the present invention, with the polyester preferably copolymerizing 0.1 to 10 mol % of an isophthalic acid component having a metal sulfonate group, and 0.1 to 5.0% by weight of a polyoxy alkylene glycol component having a number average molecular weight of 400 to 6000, and further preferably with the polyester composition containing 0.5 to 7.0% by weight of titanium dioxide particles.

Also, the polyester fiber according to the present invention is preferably an industrial polyester fiber. Industrial polyester fibers require high strength values, and the polyester composition according to the present invention is suitable to this application since excellent mechanical properties can be obtained due to little foreign matter therein.

The intrinsic viscosity of the polyester composition according to the present invention is preferably 0.85 or higher from the perspective of strength, toughness, and durability, and more preferably 0.90 or higher. Further, from the perspective of thread formation, 1.3 or lower is preferable.

With the industrial polyester fiber according to the present invention, the toughness defined by the product of the strength T and the square root of the elongation E of the fiber is preferably 28 or higher, with 30 or higher being even more preferable. Toughness of 28 or higher yields sufficiently satisfactory strength and durability.

Also, with the industrial polyester fiber according to the present invention, the dimensional stability represented by the sum of intermediate elongation (elongation corresponding to strength of 4.0 cN/dtex) and dry-heat shrinkage is 12% or lower, preferably 10% or lower, and even more preferably 8% or lower. With shrinkage is 12% or lower, cords can be obtained which are satisfactory as a material for reinforcing rubber with balanced strength, toughness, and durability, as well as maintaining the uniformity of tires when forming tires. Dimensional stability of 8% or less enables substituting for rayon in forming tires.

In addition to tire cords, the industrial polyester fiber according to the present invention can also be applied to the following uses. For example, using in energy absorbing belts such as seatbelts and the like allows greater shock to be absorbed than with conventional textile of the same amount, or the same shock absorbing capabilities can be obtained with textile that is thinner and more readily stored than conventional textiles. Also, use in protective mesh sheets for construction work and the like allows reduction in weight and consequently ease of work, since the amount of fabric used is less than conventional articles. Further, use as a belt reinforcing material yields a belt with excellent durability which is not as easily broken or damaged by shock or biting foreign objects. Other examples of products to which the industrial polyester fiber according to the present invention is advantageously applied includes conveyer belts, safety belts, safety nets, sheets for civil engineering, seepage control sheets, ropes, fishing nets, tent fabric, heavy fabric, flexible containers, sailcloth, airbag fabric, hose reinforcing material, and so forth.

Also, the polyester fiber according to the present invention is preferably used as a sewing machine thread, due to the aforementioned excellent mechanical properties due to little foreign matter therein. The polyester fiber for sewing machine thread according to the present invention should have strength of 7.1 to 8.5 cN/dtex. Strength of 7.1 cN/dtex or higher yields strength satisfactory for sewing machine thread. Strength of 8.5 cN/dtex is sufficient, so 8.5 cN/dtex or lower is preferable from the perspective of plant operations and facility maintenance.

The polyester fiber for a sewing machine thread according to the present invention has elongation of 14 to 24%. Elongation of 14% or higher yields fiber effectively, and 24% or less yields satisfactory dimensional stability.

The polyester composition or polyester fiber according to the present invention is preferably used as a polyester nonwoven fabric. The polyester composition according to the present invention has little foreign matter, and accordingly allows a nonwoven cloth having excellent yarn-disintegration properties and excellent uniformity to be provided, while suppressing thread breakage.

With a type wherein the fibers are fused to each other to form a nonwoven cloth, the polyester composition according to the present invention is produced by copolymerization of 0.1 to 20 mol % of an isophthalic acid component as to the entire acid component. Copolymerization of 0.1 mol % or more of the isophthalic acid component as to the entire acid component yields a fusibility sufficient for forming nonwoven cloth. Also, 20 mol % is sufficient as an upper limit, and preferably is 18 mol % or less from the perspective of thermal stability.

Generally, low melting point copolymerized polyester tends to exhibit soiling of the spinneret, but with the polyester composition according to the present invention, formation of foreign matter around the spinneret owing to antimony compounds is suppressed, and spinning properties are improved; accordingly, the polyester composition according to the present invention is suitable for this form wherein a third component is copolymerized.

Also, in the event of using this polyester composition as the sheath component in a core-sheath compound fiber, the core component should have a fusing point 20 to 60° C. higher than that of the sheath component, and more preferably 25 to 50° C. higher. Setting the difference in melting point between the two to be 20° C. or more enables the fusion between fibers to be strong since thermal compression at high temperature can be performed, thereby suppressing down from being generated, and also, setting the difference in fusing point between the two to be 60° C. or less enables filaments discharged from the spinneret at the time of spinning to be cooled in a stable manner even in the event that single-strand fibers are large in diameter.

EXAMPLES

[Measurement Methods]

(1) Amount of Titanium Element, Phosphorous Element, Antimony Element, and Manganese Element Contained in the Polyester Composition First, in the event that titanium dioxide particles were contained in the polyester composition, pre-processing for removing the titanium dioxide particles was performed as follows. The polyester composition was dissolved in orthochlorophenol at a ratio of 100 g solvent to 5 g polymer, the viscosity of the solution was adjusted by adding dichloromethane of an amount the same as the polymer solution, following which the solution was centrifugalized for 1 hour at 18,000 rpm, thereby settling out the particles. Subsequently, the supernatant fluid was recovered by gradient, the same amount of acetone as the supernatant was added for reprecipitation of the polymer, which was then filtered with a glass filter (3G3, manufactured by Iwaki Glass Co., Ltd.), that remaining on the filter was further washed with acetone, and then dried in a vacuum for 12 hours at room temperature to remove the acetone.

On the other hand, in the event that there were no titanium dioxide particles contained in the polyester composition, such pre-processing is unnecessary, so the polymer was analyzed as it was.

The polyester from which the titanium dioxide particles were removed was melted into a plate shape, and the amount of the titanium element, phosphorous element, antimony element, and manganese element contained was measured using an X-ray fluorescence analyzer (model MESA-500, manufactured by Horiba, Ltd.).

(2) Intrinsic Viscosity (IV) of the Polymer

Measured at 25° C. with orthochlorophenol as a solvent.

(3) Solution Haze 2.0 g of a sample was dissolved in 20 ml of orthochlorophenol, and analyzed with a haze meter (model HGM-2DP, manufactured by Suga Test Instruments Co., Ltd.) by integrating sphere photoelectric photometry.

For example, with a polyester composition not containing titanium dioxide particles, a polymer with solution haze of 2% or less can be said to have a small percentage of foreign matter and be a polymer with excellent spinning properties.

(4) Color Tone of Polymer

A chip sample of polyester resin was tested for the Hunter value (L, a, and b values) with a calorimeter (SM color computer model SM-3, manufactured by Suga Test Instruments Co., Ltd.). C light was used as the light source, with measurement performed with an incident angle of 45°, vertical photoreception, and a 2° field of view. The number of samples, n, was 10.

(5) State of Formation of Deposit Around Spinneret

Melt spinning as performed, and the deposit at the spinneret 72 hours following spinning fiber was observed using a long-focus microscope. The state of formation of the deposit was determined by the following standard.
A: Almost no deposit at all.
B: Some deposit, but within an operable range.
C: Deposit observed, and strand breakage occurs frequently.

(6) Percentage of Yarn Breakage During Drawing

Undrawn polyester fibers were drawn to various lengths as shown in the various examples and comparative examples, and with the number of broken fibers out of 1000 undrawn fibers as n, the percentage of breakage was calculated with the following expression.

Yarn breakage=(n/1000)×100

(7) Strength and Elongation of Fiber

An automatic tensile tester (ASC-5Y-A/RTA-100, manufactured by Orientec Co.) was used to obtain the weight/elongation with a sample having an initial length of 20 cm and drawn at 20 cm/minute. The maximal point of weight on the curve was divided by the initial fineness of the sample to obtain the strength, and the length of stretching of the sample at the maximal point of weight on the curve was divided by the initial length of the sample to obtain the elongation. The number of samples, n, was 10.

(8) Dye Exhaustion Percentage

A tubular fabric was woven with a 27-gauge hosiery machine (manufactured by Eiko Industrial Co., Ltd.), the tubular fabric was then refined by boiling for 5 minutes in boiling water containing 0.2% nonionic activator (Gran Up CS, manufactured by Sanyo Chemical Industries, Ltd.) and 0.2% soda ash, washed in water, and dried. The tubular fabric was then dyed for 60 minutes in a 120° C. hot water solution of Malachite Green (manufactured by Kanto Kagaku) 5% (owf), acetic acid 0.5 ml/l, and sodium acetate 0.2 g/L, with a liquor ratio of 1:100, and the dye exhaustion percentage of the tubular fabric was obtained from the difference in dye concentration in the liquid before and after dyeing. A value of 40% or higher indicates that the polymer has excellent dyeing properties.

(9) Coefficient of Variation

As a parameter indicating the non-uniformity (Coefficient of Variation) of nonwoven cloth, 100 samples 50 mm by 50 mm were taken from various places and the weight of each was measured, obtaining the CV values from the following expression.

CV value (%)=(standard variation of weight of sample)/(average weight of samples)×100

A CV value of 5% or lower means that yarn-disintegration properties are good, and a CV value of 4% or lower means that yarn-disintegration properties are excellent.

(10) Strength, Elongation, Intermediate Elongation, and Toughness of Industrial Polyester Fiber A Tensilon tensile tester (manufactured by Toyo Baldwin) was used to obtain the weight/elongation with a sample having an initial length of 25 cm and drawn at 30 cm/minute. The maximal point of weight on the curve was divided by the initial fineness of the sample to obtain the strength, and the length of stretching of the sample at the maximal point of weight on the curve was divided by the initial length of the sample to obtain the elongation. Also, the elongation corresponding to the strength 4.0 cN/dtex was taken as the intermediate elongation from the weight/elongation curve. The toughness was obtained from the strength T (cN/dtex) and elongation E(%) by $T \cdot E^{1/2}$.

(11) Dry-Heat Shrinkage

A 50 cm circumference two-wind skein of multifilament was taken as a sample, and left in a 20° C. and 65% RH environment for 24 hours, following which the length $L_0$ of the skein under a weight equivalent to 0.1 g/dtex was measured. Next, the weight was removed, the sample placed on 150° C. oven for 30 minutes with no tension, removed from the oven and left for four hours in the above-described environment, weighted again in the same way, and the length $L_1$ of the skein was measured. The dry-heat shrinkage was calculated from $L_0$ and $L_1$ with the following expression.

Dry-heat shrinkage (%)={$(L_0-L_1)/L_0$}×100

(12) Dimensional Stability

The sum of the above intermediate elongation and dry-heat shrinkage was calculated as the dimensional stability.

(13) Strength of Processed Cord

A sample was twisted 45 times per 10 cm (first twist), multiple strands were doubled, and then twisted 45 times per 10 cm (final twist) in the opposite direction, thereby forming a cord. The strength of the processed cord obtained from the industrial polyester fiber was tested in the same way as (10) above.

(14) Heat Resistance of Processed Cord in Rubber

The processed cord was embedded in rubber, and the tenacity maintaining percentage was evaluated following vulcanization at 150° C. for 6 hours. A tenacity maintaining percentage of 60% or higher is determined to be excellent, 50% or higher but less than 60% is comparable to conventional products, and less than 50% is inferior to conventional products.

(15) Fatigue Endurance (GY Fatigue Life)

In accordance with ASTM-D885, the time to tube rupture was measured under the conditions of an internal pressures of tube of 3.5 kg/cm$^2$, rotation speed of 850 rpm, and tube angle of 90°. Comparison was made with a conventional tire cord (1000-240-703M, manufactured by Toray Industries) regarding the time till rupturing, and evaluated as follows.
AA: Improved 10 to 30% over conventional product.
A: Improved 0 to 10% over conventional product.
C: Time to rupturing shorter than conventional product.

Example 1

(Preparing Catalyst Compound)

(Preparing Titanium Catalyst Solution)

Warm (50° C.) water (371 g) was put into a 3 liter flask having a stirrer, condenser, and thermometer, into which a citric acid monohydrate (532 g, 2.52 mol) was dissolved. While stirring the solution, titanium tetraisopropoxide (288 g, 1.00 mol) was slowly added thereto from a dropping funnel. This compound was refluxed for 1 hour under heat, so as to generate a cloudy solution, and the isopropanol/water thereof was distilled and removed under a vacuum. The remainder was cooled to under 70° C., and the solution thereof was stirred while slowly adding 32 weight/weight % aqueous solution of NaOH (380 g, 3.04 mol) from a dropping funnel. The generated product was filtered, then mixed with ethylene glycol (504 g, 8 mol), and heated under vacuum to remove the isopropanol/water, thereby obtaining a slightly cloudy, light-yellow product containing a chelated titanium citrate (containing 3.85% by weight of titanium).

(Adding Phosphorous Compound)

To the titanium catalyst solution was added 85 weight/weight % aqueous solution of phosphoric acid (114 g, 1.00 mol), thereby yielding a titanium catalyst composition having a phosphorous compound (containing 2.49% by mass of phosphorous).

(Producing Polyester Composition)

123 kg of bis(2-hydroxyethyl) terephthalate was placed in an esterification reaction vat beforehand and maintained at a temperature of 250° C. and a pressure of 1.2×10$^5$ Pa, into which was continuously supplied a slurry of 100 kg of high-purity terephthalic acid (manufactured by Mitsui Chemicals) and 45 kg of ethylene glycol (manufactured by Nihon Shokubai) over a period of 4 hours, and following supplying, esterification reaction was performed for 1 hour while distilling out water.

Next, 123 kg of the esterification reaction product was transported to a polycondensation vat.

Then, an ethylene glycol slurry of bis(2,6-di-tert-butyl-4-methylphenyl) pentaerithritol-di-phosphite (ADEKASTAB PEP-36, manufactured by Asahi Denka Co., Ltd.) was added so as to be 50 ppm by mass to the target production amount of polyester (5 ppm by mass in terms of phosphorous atoms), and stirred for 5 minutes. This ADEKASTAB PEP-36 will be referred to as "phosphorous compound 1" hereafter.

Next, an ethylene glycol slurry of titanium dioxide particles was added so as to be 0.3% by mass in terms of titanium dioxide to the target production amount of polyester, and further stirred for 5 minutes. Further, an ethylene glycol solution of cobalt acetate and manganese acetate was added so as to be 30 ppm by mass in terms of cobalt atoms and 15 ppm by mass in terms of manganese atoms to the target production amount of polyester, and further stirred for 5 minutes.

Next, the catalyst compound A was added so as to be 10 ppm by mass to the target production amount of polyester in terms of titanium atoms, the low polymer was stirred at 30 rpm while gradually raising the temperature of the reactive system from 250° C. to 285° C. and lowering the pressure to 40 Pa. The speed of increasing temperature and speed of reducing pressure were both adjusted so as to reach the final temperature and final pressure in 60 minutes.

Stirring was continued at 30 rpm, and at the point that a predetermined stirring torque was reached, the reactive system was subjected to nitrogen purging and returned to normal pressure, thereby stopping the polymerization reaction, and discharged into cold water in strands and immediately cut so as to obtain polymer pellets. The time from starting pressure reduction to reaching the predetermined stirring torque was 3 hours.

The intrinsic viscosity of the obtained polymer was 0.66, the color tone was L=77, a =−1.1, and b=0.5, and the solution haze was 0.7%. Also confirmed by measurement was that the amount of titanium atoms originating from the titanium catalyst measured from the polymer was 10 ppm by mass, the amount of phosphorous atoms contained was 13 ppm by mass, Ti/P was 0.50, and the amount of antimony atoms contained was 0 ppm by mass.

(Melt-Spinning, Drawing)

The obtained polyester was dried, supplied to a spinning machine, molten at 290° C. in a melter, measured with a gear pump, discharged at 300° C. from a spinning pack, and taken up at a speed of 2000 m/minute. The obtained undrawn strand was drawn to 2.8 times at 80° C., and then subjected to thermal setting with a 125° C. roller, thereby obtaining a 75 denier (83 dtex) 36 filament drawn yarn.

(Producing Polyester Composition)

A polyester composition was obtained in the same way as with Example 1 except for using the above catalyst composition and adding the phosphorous compound 1 so as to be 300 ppm by mass to the target production amount of polyester in terms of phosphorous atoms.

(Melt Spinning, Drawing)

Carried out in the same way as with Example 1, except for using the above-described polyester composition.

TABLE 1

|  | Example 1 | Example 2 | Example 3 |
|---|---|---|---|
| Titanium compound | chelated titanium citrate compound | chelated titanium citrate compound | chelated titanium citrate compound |
| Amount (ppm by mass) | 10 | 10 | 10 |
| Phosphorous compound A | phosphoric acid | phenylphosphonic acid | phenylphosphonic acid, phosphoric acid |
| Amount (ppm by mass) | 8 | 6 | 8 |
| Phosphorous compound B | Phosphorous compound 1 | Phosphorous compound 1 | Phosphorous compound 1 |
| Amount (ppm by mass) | 5 | 1 | 300 |
| Manganese compound | Mn acetate | Mn acetate | Mn acetate |
| Amount (ppm by mass) | 15 | 15 | 15 |
| Antimony compound | — | — | — |
| Amount (ppm by mass) | 0 | 0 | 0 |
| Ti/P | 0.50 | 0.90 | 0.02 |
| Mn/P | 0.65 | 1.17 | 0.03 |
| Intrinsic viscosity IV | 0.66 | 0.66 | 0.66 |
| Solution haze (%) | 0.7 | 0.7 | 0.9 |
| L value | 77 | 75 | 72 |
| a value | −1.1 | −0.9 | −1.2 |
| b value | 0.5 | 0.7 | −1.5 |
| State of deposit at spinneret | A | A | A |

Example 2

(Preparing Catalyst Compound)

(Preparing Titanium Catalyst Solution)

Carried out in the same way as with Example 1.

(Adding Phosphorous Compound)

To the titanium catalyst solution was added phenylphosphonic acid (158 g, 1.00 mol), thereby yielding a titanium catalyst composition having a phosphorous compound (containing 2.49% by mass of P).

(Producing Polyester Composition)

A polyester composition was obtained in the same way as with Example 1 except for using the above catalyst composition and adding the phosphorous compound 1 so as to be 1 ppm by mass to the target production amount of polyester in terms of phosphorous atoms.

(Melt Spinning, Drawing)

Carried out in the same way as with Example 1, except for using the above-described polyester composition.

Example 3

(Preparing Catalyst Compound)

(Preparing Titanium Catalyst Solution)

Carried out in the same way as with Example 1.

(Adding Phosphorous Compound)

To the titanium catalyst solution was added 85 weight/weight % of an aqueous solution of phosphoric acid (39.9 g, 0.35 mol) and phenylphosphonic acid (158 g, 1.00 mol), thereby yielding a titanium catalyst composition having a phosphorous compound (containing 2.49% by mass of P).

Phosphorous compound A: phosphorous compound added to titanium catalyst compound Phosphorous compound B: phosphorous compound added to system separate from titanium catalyst compound Amounts in Table are in terms of metal or phosphorous atoms.

The color tone of the polymers obtained with each of the Examples 1 through 3 was excellent.

Also, in the melt spinning process, there was hardly any deposit around the spinneret and increased filter pressure when spinning, and there was hardly no strand breakage when drawing. That is, all of Examples 1 through 3 were polymers with excellent formation workability.

Example 4

(Preparing Catalyst Compound)

(Preparing Titanium Catalyst Solution)

Titanium tetraisopropoxide (285 g, 1.00 mol) was put into a 2 liter flask having a stirrer, condenser, and thermometer, into which ethylene glycol (218 g, 3.51 mol) was added from a dropping funnel while stirring. The speed of adding was adjusted so that the reaction temperature kept the temperature within the flask at approximately 50° C. Following this reaction, the reaction compound was stirred for 15 minutes. Following stirring, 85 weight/weight % of an aqueous solution of ammonium lactate (252 g, 2.00 mol) was added, thereby obtaining a transparent, light-yellow product containing a chelated titanium lactate (containing 6.54% by weight of titanium).

(Adding Phosphorous Compound)

To the titanium catalyst solution was added 85 weight/weight % aqueous solution of phosphoric acid (114 g, 1.00 mol), thereby yielding a titanium catalyst composition having a phosphorous compound (containing 4.23% by weight of P).

(Producing Polyester Composition)

A polyester composition was obtained in the same way as with Example 1 except for using the above catalyst composition.

(Melt Spinning, Drawing)

Carried out in the same way as with Example 1, except for using the above-described polyester composition.

(Producing Polyester Composition)

A polyester composition was obtained in the same way as with Example 4 except for using the above catalyst composition and adding the phosphorous compound 1 so as to be 300 ppm by mass to the target production amount of polyester in terms of phosphorous atoms.

(Melt Spinning, Drawing)

Carried out in the same way as with Example 4, except for using the above-described polyester composition.

TABLE 2

|  | Example 4 | Example 5 | Example 6 |
|---|---|---|---|
| Titanium compound | chelated titanium lactate compound | chelated titanium lactate compound | chelated titanium lactate compound |
| Amount (ppm by mass) | 10 | 10 | 10 |
| Phosphorous compound A | phosphoric acid | phenylphosphonic acid | phenylphosphonic acid, phosphoric acid |
| Amount (ppm by mass) | 8 | 6 | 8 |
| Phosphorous compound B | Phosphorous compound 1 | Phosphorous compound 1 | Phosphorous compound 1 |
| Amount (ppm by mass) | 5 | 1 | 300 |
| Manganese compound | Mn acetate | Mn acetate | Mn acetate |
| Amount (ppm by mass) | 15 | 15 | 15 |
| Antimony compound | — | — | — |
| Amount (ppm by mass) | 0 | 0 | 0 |
| Ti/P | 0.50 | 0.90 | 0.02 |
| Mn/P | 0.65 | 1.17 | 0.03 |
| Intrinsic viscosity IV | 0.66 | 0.66 | 0.66 |
| Solution haze (%) | 0.7 | 0.7 | 0.9 |
| L value | 76 | 77 | 71 |
| a value | −1.0 | −1.0 | −1.3 |
| b value | 0.4 | 0.8 | −1.6 |
| State of deposit at spinneret | A | A | A |

Example 5

(Preparing Catalyst Compound)
(Preparing Titanium Catalyst Solution)
Carried out in the same way as with Example 4.
(Adding Phosphorous Compound)
To the titanium catalyst solution was added phenylphosphonic acid (158 g, 1.00 mol), thereby yielding a titanium catalyst composition having a phosphorous compound (containing 4.23% by mass of P).

(Producing Polyester Composition)

A polyester composition was obtained in the same way as with Example 4 except for using the above catalyst composition and adding the phosphorous compound 1 so as to be 1 ppm by mass to the target production amount of polyester in terms of phosphorous atoms.

(Melt Spinning, Drawing)

Carried out in the same way as with Example 4, except for using the above-described polyester composition.

Example 6

(Preparing Catalyst Compound)
(Preparing Titanium Catalyst Solution)
Carried out in the same way as with Example 4.
(Adding Phosphorous Compound)
To the titanium catalyst solution was added 85 weight/weight % of an aqueous solution of phosphoric acid (39.9 g, 0.35 mol) and phenylphosphonic acid (158 g, 1.00 mol), thereby yielding a titanium catalyst composition having a phosphorous compound (containing 5.71% by mass of P).

Phosphorous compound A: phosphorous compound added to titanium catalyst compound Phosphorous compound B: phosphorous compound added to system separate from titanium catalyst compound Amounts in Table are in terms of metal or phosphorous atoms.

The color tone of the polymers obtained with each of the Examples 4 through 6 was excellent.

Also, in the melt spinning process, there was hardly any deposit around the spinneret and increased filter pressure when spinning, and there was hardly no strand-breakage when drawing. That is, all of Examples 4 through 6 were polymers with excellent formation workability.

Example 7

(Preparing Catalyst Compound)
(Preparing Titanium Catalyst Solution)
Carried out in the same way as with Example 1.
(Adding Phosphorous Compound)
No phosphorous compound was added at this stage.

(Producing Polyester Composition)

A polyester composition was obtained in the same way as with Example 1 except for using the above catalyst compound, and using phenylphosphite (manufactured by Sigma-Aldrich Co.) (phosphorous compound 2) instead of the phosphorous compound 1 so as to be 50 ppm by mass to the target production amount of polyester in terms of phosphorous atoms.

(Melt Spinning, Drawing)
Carried out in the same way as with Example 1, except for using the above-described polyester composition.

Example 8

(Preparing Catalyst Compound)
(Preparing Titanium Catalyst Solution)
Carried out in the same way as with Example 1.
(Adding Phosphorous Compound)
No phosphorous compound was added at this stage.

(Producing Polyester Composition)
A polyester composition was obtained in the same way as with Example 1 except for using the above catalyst compound, and using tris(mononylphenyl) phosphite (manufactured by Sigma-Aldrich Co.) (phosphorous compound 3) instead of the phosphorous compound 1 so as to be 50 ppm by mass to the target production amount of polyester in terms of phosphorous atoms.

(Melt Spinning, Drawing)
Carried out in the same way as with Example 1, except for using the above-described polyester composition.

TABLE 3

|  | Example 7 | Example 8 |
|---|---|---|
| Titanium compound | chelated titanium citrate compound | chelated titanium citrate compound |
| Amount (ppm by mass) | 10 | 10 |
| Phosphorous compound A | — | — |
| Amount (ppm by mass) | 0 | 0 |
| Phosphorous compound B | Phosphorous compound 2 | Phosphorous compound 3 |
| Amount (ppm by mass) | 50 | 50 |
| Manganese compound | Mn acetate | Mn acetate |
| Amount (ppm by mass) | 15 | 15 |
| Antimony compound | — | — |
| Amount (ppm by mass) | 0 | 0 |
| Ti/P | 0.13 | 0.13 |
| Mn/P | 0.17 | 0.17 |
| Intrinsic viscosity IV | 0.66 | 0.66 |
| Solution haze (%) | 0.8 | 0.8 |
| L value | 76 | 76 |
| a value | −1.1 | −1.1 |
| b value | 1.0 | 0.8 |
| State of deposit at spinneret | A | A |

Phosphorous compound A: phosphorous compound added to titanium catalyst compound
Phosphorous compound B: phosphorous compound added to system separate from titanium catalyst compound Amounts in Table are in terms of metal or phosphorous atoms.

The color tone of the polymers obtained with both the Examples 7 and 8 was excellent.

Also, in the melt spinning process, there was hardly any deposit around the spinneret and increased filter pressure when spinning, and there was hardly no strand breakage when drawing. That is, both Examples 7 and 8 were polymers with excellent formation workability.

Example 9

(Preparing Catalyst Compound)
(Preparing Titanium Catalyst Solution)
Carried out in the same way as with Example 4.
(Adding Phosphorous Compound)
No phosphorous compound was added at this stage.

(Producing Polyester Composition)
A polyester composition was obtained in the same way as with Example 4 except for using the above catalyst compound, and using phosphorous compound 2 instead of the phosphorous compound 1 so as to be 50 ppm by mass to the target production amount of polyester in terms of phosphorous atoms.

(Melt Spinning, Drawing)
Carried out in the same way as with Example 1, except for using the above-described polyester composition.

Example 10

(Preparing Catalyst Compound)
(Preparing Titanium Catalyst Solution)
Carried out in the same way as with Example 4.
(Adding Phosphorous Compound)
No phosphorous compound was added at this stage.

(Producing Polyester Composition)
A polyester composition-was obtained in the same way as with Example 4 except for using the above catalyst compound, and using phosphorous compound 3 instead of the phosphorous compound 1 so as to be 50 ppm by mass to the target production amount of polyester in terms of phosphorous atoms.

(Melt Spinning, Drawing)
Carried out in the same way as with Example 1, except for using the above-described polyester composition.

TABLE 4

|  | Example 9 | Example 10 |
|---|---|---|
| Titanium compound | chelated titanium lactate compound | chelated titanium lactate compound |
| Amount (ppm by mass) | 10 | 10 |
| Phosphorous compound A | — | — |
| Amount (ppm by mass) | 0 | 0 |
| Phosphorous compound B | Phosphorous compound 2 | Phosphorous compound 3 |
| Amount (ppm by mass) | 50 | 50 |
| Manganese compound | Mn acetate | Mn acetate |
| Amount (ppm by mass) | 15 | 15 |
| Antimony compound | — | — |
| Amount (ppm by mass) | 0 | 0 |
| Ti/P | 0.13 | 0.13 |
| Mn/P | 0.17 | 0.17 |
| Intrinsic viscosity IV | 0.66 | 0.66 |
| Solution haze (%) | 0.8 | 0.8 |
| L value | 75 | 75 |
| a value | −1.0 | −1.0 |
| b value | 0.9 | 1.1 |
| State of deposit at spinneret | A | A |

Phosphorous compound A: phosphorous compound added to titanium catalyst compound
Phosphorous compound B: phosphorous compound added to system separate from titanium catalyst compound Amounts in Table are in terms of metal or phosphorous atoms.

The color tone of the polymers obtained with both the Examples 9 and 10 was excellent.

Also, in the melt spinning process, there was hardly any deposit around the spinneret and increased filter pressure when spinning, and there was hardly no strand breakage when drawing. That is, both Examples 9 and 10 were polymers with excellent formation workability.

Example 11

(Preparing Catalyst Compound)

Carried out in the same way as with Example 1.

(Producing Polyester Composition)

A polyester composition was obtained in the same way as with Example 1 except for using the above catalyst composition and using bis(2,4-di-tert-butylphenyl) pentaerithritol-di-phosphite (ADEKASTAB PEP-24G, manufactured by Asahi Denka Co., Ltd.) (phosphorous compound 4) instead of the phosphorous compound 1 so as to be 5 ppm by mass to the target production amount of polyester in terms of phosphorous atoms.

(Melt Spinning, Drawing).

Carried out in the same way as with Example 1, except for using the above-described polyester composition.

Example 12

(Preparing Catalyst Compound)
(Preparing Titanium Catalyst Solution)
Carried out in the same way as with Example 1.
(Adding Phosphorous Compound)
To the titanium catalyst solution was added phenylphosphonic acid (158 g, 1.00 mol), thereby yielding a titanium catalyst composition having a phosphorous compound (containing 1.66% by mass of P).

(Producing Polyester Composition)

A polyester composition was obtained in the same way as with Example 1 except for using the above catalyst composition and adding the phosphorous compound 4 instead of the phosphorous compound 1 so as to be 1 ppm by mass to the target production amount of polyester in terms of phosphorous atoms, and further adjusting the amount of adding the catalyst compound so as to be 15 ppm by mass in terms of titanium atoms.

(Melt Spinning, drawing)

Carried out in the same way as with Example 1, except for using the above-described polyester composition.

Example 13

(Preparing Catalyst Compound)
(Preparing Titanium Catalyst Solution)
Carried out in the same way as with Example 1.
(Adding Phosphorous Compound)
To the titanium catalyst solution was added 85 weight/ weight % of an aqueous solution of phosphoric acid (39.9 g, 0.35 mol) and phenylphosphonic acid (158 µg, 1.00 mol), thereby yielding a titanium catalyst composition having a phosphorous compound (containing 4.98% by mass of P).

(Producing Polyester Composition)

A polyester composition was obtained in the same way as with Example 1 except for using the above catalyst composition and adding the phosphorous compound 4 instead of the phosphorous compound 1 so as to be 300 ppm by mass to the target production amount of polyester in terms of phosphorous atoms, and further adjusting the amount of adding the catalyst compound so as to be 5 ppm by mass in terms of titanium atoms, the amount of addition of manganese acetate so as to be 30 ppm by mass, and moreover, adding antimony trioxide as another catalyst so as to be 20 ppm by mass to the target production amount of polyester in terms of antimony atoms.

(Melt Spinning, Drawing)

Carried out in the same way as with Example 1, except for using the above-described polyester composition.

TABLE 5

|  | Example 11 | Example 12 | Example 13 |
|---|---|---|---|
| Titanium compound | chelated titanium citrate compound | chelated titanium citrate compound | chelated titanium citrate compound |
| Amount (ppm by mass) | 10 | 15 | 5 |
| Phosphorous compound A | phosphoric acid | phenylphosphonic acid | phenylphosphonic acid, phosphoric acid |
| Amount (ppm by mass) | 8 | 6 | 8 |
| Phosphorous compound B | Phosphorous compound 4 | Phosphorous compound 4 | Phosphorous compound 4 |
| Amount (ppm by mass) | 5 | 1 | 300 |
| Manganese compound | Mn acetate | Mn acetate | Mn acetate |
| Amount (ppm by mass) | 15 | 15 | 30 |
| Antimony compound | — | — | Sb trioxide |
| Amount (ppm by mass) | 0 | 0 | 20 |
| Ti/P | 0.50 | 1.35 | 0.01 |
| Mn/P | 0.65 | 1.17 | 0.05 |
| Intrinsic viscosity IV | 0.66 | 0.66 | 0.66 |
| Solution haze (%) | 0.7 | 0.8 | 1.5 |
| L value | 75 | 75 | 71 |
| a value | −0.8 | −0.9 | −1.0 |
| b value | 0.3 | 1.0 | 0.1 |
| State of deposit at spinneret | A | A | B |

Phosphorous compound A: phosphorous compound added to titanium catalyst compound Phosphorous compound B: phosphorous compound added to system separate from titanium catalyst compound Amounts in Table are in terms of metal or phosphorous atoms.

The color tone of the polymers obtained with both the Examples 11 and 12 was excellent.

Also, in the melt spinning process, there was hardly any deposit around the spinneret and increased filter pressure when spinning, and there was hardly no strand breakage when drawing. That is, both the Examples 11 and 12 were polymers with excellent formation workability.

As for Example 13, the obtained polymer had excellent color tone, and while some deposit around the spinneret was observed when spinning, an operable state was maintained.

Example 14

(Preparing Catalyst Compound)
Carried out in the same way as with Example 4.

(Producing Polyester Composition)
A polyester composition was obtained in the same way as with Example 4 except for using the above catalyst composition and using the phosphorous compound 4 instead of the phosphorous compound 1 so as to be 5 ppm by mass to the target production amount of polyester in terms of phosphorous atoms.

(Melt Spinning, Drawing)
Carried out in the same way as with Example 4, except for using the above-described polyester composition.

Example 15

(Preparing Catalyst COMPOUND)
(Preparing Titanium Catalyst Solution)
Carried out in the same way as with Example 4.
(Adding phosphorous compound)
To the titanium catalyst solution was added phenylphosphonic acid (158 g, 1.00 mol), thereby yielding a titanium catalyst composition having a phosphorous compound (containing 2.82% by mass of P).

(Producing Polyester Composition)
A polyester composition was obtained in the same way as with Example 4 except for using the above catalyst composition and adding 1 ppm by mass of the phosphorous compound 4 instead of the phosphorous compound 1 to the target production-amount of polyester in terms of phosphorous atoms, and adjusting the amount of addition of the catalyst compound so as to be 15 ppm by mass.

(Melt Spinning, Drawing)
Carried out in the same way as with Example 4, except for using the above-described polyester composition.

Example 16

(Preparing Catalyst Compound)
(Preparing Titanium Catalyst Solution)
Carried out in the same way as with Example 4.
(Adding Phosphorous Compound)
To the titanium catalyst solution was added 85 weight/weight % of an aqueous solution of phosphoric acid (39.9 g, 0.35 mol) and phenylphosphonic acid (158 g, 1.00 mol), thereby yielding a titanium catalyst composition having a phosphorous compound (containing 11.42% by mass of P).

(Producing Polyester Composition)
A polyester composition was obtained in the same way as with Example 4 except for using the above catalyst composition and adding the phosphorous compound 4 instead of the phosphorous compound 1 so as to be 300 ppm by mass to the target production amount of polyester in terms of phosphorous atoms, and further adjusting the amount of adding the catalyst compound so as to be 5 ppm by mass in terms of titanium atoms, the amount of addition of manganese acetate so as to be 40 ppm by mass, and moreover, adding antimony trioxide as another catalyst so as to be 20 ppm by mass to the target production amount of polyester in terms of antimony atoms.

(Melt Spinning, Drawing)
Carried out in the same way as with Example 4, except for using the above-described polyester composition.

TABLE 6

|  | Example 14 | Example 15 | Example 16 |
| --- | --- | --- | --- |
| Titanium compound | chelated titanium lactate compound | chelated titanium lactate compound | chelated titanium lactate compound |
| Amount (ppm by mass) | 10 | 15 | 5 |
| Phosphorous compound A | phosphoric acid | phenylphosphonic acid | phenylphosphonic acid, phosphoric acid |
| Amount (ppm by mass) | 8 | 6 | 8 |
| Phosphorous compound B | Phosphorous compound 4 | Phosphorous compound 4 | Phosphorous compound 4 |
| Amount (ppm by mass) | 5 | 1 | 300 |
| Manganese compound | Mn acetate | Mn acetate | Mn acetate |
| Amount (ppm by mass) | 15 | 15 | 40 |
| Antimony compound | — | — | Sb trioxide |
| Amount (ppm by mass) | 0 | 0 | 20 |
| Ti/P | 0.50 | 1.35 | 0.01 |
| Mn/P | 0.65 | 1.17 | 0.07 |
| Intrinsic viscosity IV | 0.66 | 0.66 | 0.66 |
| Solution haze (%) | 0.7 | 0.8 | 1.6 |
| L value | 75 | 74 | 70 |
| a value | −1.1 | −1.0 | −0.9 |
| b value | 0.2 | 1.2 | 0.5 |
| State of deposit at spinneret | A | A | B |

Phosphorous compound A: phosphorous compound added to titanium catalyst compound
Phosphorous compound B: phosphorous compound added to system separate from titanium catalyst compound
Amounts in Table are in terms of metal or phosphorous atoms.

The color tone of the polymers obtained with both the Examples 14 and 15 was excellent.

Also, in the melt spinning process, there was hardly any deposit around the spinneret and increased filter pressure when spinning, and there was hardly no strand breakage when drawing. That is, both the Examples 14 and 15 were polymers with excellent formation workability.

As for Example 16, the obtained polymer had excellent color tone, and while some deposit around the spinneret was observed when spinning, an operable state was maintained.

Example 17

(Preparing Catalyst Compound)

Carried out in the same way as with Example 1.

(Producing Polyester Composition)

A polyester composition was obtained in the same way as with Example 1 except for using the above catalyst compound, and using 2,2-methylene bis(4,6-di-tert-butylphenyl) octylphosphite (ADEKASTAB HP-10, manufactured by Asahi Denka Co., Ltd.) (phosphorous compound 5), instead of the phosphorous compound 1, so as to be 50 ppm by mass to the target production amount of polyester in terms of phosphorous atoms.

(Melt Spinning, Drawing)

Carried out in the same way as with Example 1, except for using the above-described polyester composition.

Example 18

(Preparing Catalyst Compound)

Carried out in the same way as with Example 1.

(Producing Polyester Composition)

A polyester composition was obtained in the same way as with Example 1 except for using the above catalyst compound, and using tris(2,4-di-tert-butylphenyl) phosphite (ADEKASTAB 2112, manufactured by Asahi Denka Co., Ltd.) (phosphorous compound 6), instead of the phosphorous compound 1, so as to be 50 ppm by mass to the target production amount of polyester in terms of phosphorous atoms.

(Melt Spinning, Drawing)

Carried out in the same way as with Example 1, except for using the above-described polyester composition.

TABLE 7

|  | Example 17 | Example 18 |
|---|---|---|
| Titanium compound | chelated titanium citrate compound | chelated titanium citrate compound |
| Amount (ppm by mass) | 10 | 10 |
| Phosphorous compound A | Phosphoric acid | Phosphoric acid |
| Amount (ppm by mass) | 6 | 6 |
| Phosphorous compound B | Phosphorous compound 5 | Phosphorous compound 6 |
| Amount (ppm by mass) | 50 | 50 |
| Manganese compound | Mn acetate | Mn acetate |
| Amount (ppm by mass) | 15 | 15 |
| Antimony compound | — | — |
| Amount (ppm by mass) | 0 | 0 |
| Ti/P | 0.12 | 0.12 |
| Mn/P | 0.15 | 0.15 |
| Intrinsic viscosity IV | 0.66 | 0.66 |
| Solution haze (%) | 0.9 | 0.8 |
| L value | 75 | 76 |
| a value | −1.0 | −1.0 |
| b value | 1.2 | 1.7 |
| State of deposit at spinneret | A | A |

Phosphorous compound A: phosphorous compound added to titanium catalyst compound Phosphorous compound B: phosphorous compound added to system separate from titanium catalyst compound Amounts in Table are in terms of metal or phosphorous atoms.

The color tone of the polymers obtained with both the Examples 17 and 18 was excellent.

Also, in the melt spinning process, there was hardly any deposit around the spinneret and increased filter pressure when spinning, and there was hardly no strand breakage when drawing. That is, both Examples 17 and 18 were polymers with excellent formation workability.

Example 19

(Preparing Catalyst Compound)

Carried out in the same way as with Example 4.

(Producing Polyester Composition)

A polyester composition was obtained in the same way as with Example 4 except for using the above catalyst compound, and using the phosphorous compound 5 instead of the phosphorous compound 1, so as to be 50 ppm by mass to the target production amount of polyester in terms of phosphorous atoms.

(Melt Spinning, Drawing)

Carried out in the same way as with Example 4, except for using the above-described polyester composition.

Example 20

(Preparing Catalyst Compound)

Carried out in the same way as with Example 4.

(Producing Polyester Composition)

A polyester composition was obtained in the same way as with Example 4 except for using the above catalyst compound, and using the phosphorous compound 6 instead of the phosphorous compound 1, so as to be 50 ppm by mass to the target production amount of polyester in terms of phosphorous atoms.

(Melt Spinning, Drawing)

Carried out in the same way as with Example 4, except for using the above-described polyester composition.

TABLE 8

|  | Example 19 | Example 20 |
|---|---|---|
| Titanium compound | chelated titanium lactate compound | chelated titanium lactate compound |
| Amount (ppm by mass) | 10 | 10 |
| Phosphorous compound A | Phosphoric acid | Phosphoric acid |
| Amount (ppm by mass) | 6 | 6 |
| Phosphorous compound B | Phosphorous compound 5 | Phosphorous compound 6 |
| Amount (ppm by mass) | 50 | 50 |

TABLE 8-continued

| | Example 19 | Example 20 |
|---|---|---|
| Manganese compound | Mn acetate | Mn acetate |
| Amount (ppm by mass) | 15 | 15 |
| Antimony compound | — | — |
| Amount (ppm by mass) | 0 | 0 |
| Ti/P | 0.12 | 0.12 |
| Mn/P | 0.15 | 1.15 |
| Intrinsic viscosity IV | 0.66 | 0.66 |
| Solution haze (%) | 0.8 | 0.9 |
| L value | 75 | 75 |
| a value | −0.9 | −1.0 |
| b value | 1.3 | 1.6 |
| State of deposit at spinneret | A | A |

Phosphorous compound A: phosphorous compound added to titanium catalyst compound Phosphorous compound B: phosphorous compound added to system separate from titanium catalyst compound Amounts in Table are in terms of metal or phosphorous atoms.

The color tone of the polymers obtained with both the Examples 19 and 20 was excellent.

Also, in the melt spinning process, there was hardly any deposit around the spinneret and increased filter pressure when spinning, and there was hardly no strand breakage when drawing. That is, both Examples 19 and 20 were polymers with excellent formation workability.

Comparative Example 1

(Producing Polyester Composition)

A polyester composition was obtained in the same way as with Example 1 except for adding 10 ppm by mass of tetrabuthoxy titanium (manufactured by Nippon Soda Co., Ltd.) as a titanium catalyst so as to be 10 ppm by mass to the target production amount of polyester in terms of titanium atoms, adding the phosphoric acid was omitted, and the amount of addition of the phosphorous compound 1 was 100 ppm by mass to the target production amount of polyester in terms of phosphorous atoms.

(Melt Spinning, Drawing)

Carried out in the same way as with Example 1, except for using the above-described polyester composition.

In the melt spinning process, there was hardly any deposit around the spinneret and increased filter pressure when spinning, and there was hardly no strand breakage at the time of drawing, with excellent formation workability as a polymer, but the color tone b value of the polymer obtained was 10.3, which is high, and the polymer had a poor yellow color tone.

Comparative Example 2

(Producing Polyester Composition)

A polyester composition was obtained in the same way as with Example 1 except that a titanium catalyst was not used, the amount of addition of the phosphoric acid was 10 ppm by mass to the target production amount of polyester in terms of phosphorous atoms, the amount of addition or the phosphorous compound 1 was 500 ppm, by mass to the target production amount of polyester in terms of phosphorous atoms and antimony trioxide (manufactured by Sumitomo Metal Mining Co., Ltd.) as a catalyst was added 400 ppm by mass to the target production amount of polyester in terms of antimony atoms.

(Melt Spinning, Drawing)

Carried out in the same way as with Example 1, except for using the above-described polyester composition.

The polymerization reaction progressed favorably even though the catalyst was replaced, and there was no problem with the color tone of the polymer obtained, but the haze of the polymer was a high 3.4%, and the operation was poor in that deposition at the spinneret was observed when spinning, which resulted in frequent strand breakage.

Comparative Example 3

(Preparing Catalyst Compound)

An ethylene glycol solution including tetraisopropoxy titanium (manufactured by Nippon Soda Co., Ltd.) and phosphoric acid was prepared.

(Producing Polyester Composition)

A polyester composition was obtained in the same way as with Example 1 except for omitting adding of the phosphorous compound, and the above catalyst compound was added so as to be 10 ppm by mass to the target production amount of polyester in terms of phosphorous atoms.

(Melt Spinning, Drawing)

Carried out in the same way as with Example 1, except for using the above-described polyester composition.

The polymerization reaction progressed favorably even though the catalyst was replaced, and there was hardly any deposit around the spinneret and increased filter pressure when spinning, and hardly no strand breakage at the time of drawing, with excellent formation workability as a polymer, but the color tone b value of the polymer obtained was 13.8, which is high, and the polymer had a poor yellow color tone.

TABLE 9

| | Comparative Example 1 | Comparative Example 2 | Comparative Example 3 |
|---|---|---|---|
| Titanium compound | Tetrabuthoxy titanium | — | Tetraisopropoxy titanium |
| Amount (ppm by mass) | 10 | 0 | 10 |
| Phosphorous compound A | — | phosphoric acid | phosphoricacid |
| Amount (ppm by mass) | 0 | 10 | 1 |
| Phosphorous compound B | Phosphorous compound 1 | Phosphorous compound 1 | — |
| Amount (ppm by mass) | 100 | 500 | — |
| Manganese compound | Mn acetate | — | Mn acetate |

TABLE 9-continued

|  | Comparative Example 1 | Comparative Example 2 | Comparative Example 3 |
| --- | --- | --- | --- |
| Amount (ppm by mass) | 15 | 0 | 15 |
| Antimony compound | — | Sb trioxide | — |
| Amount (ppm by mass) | 0 | 400 | 0 |
| Ti/P | 0.06 | — | 6.47 |
| Mn/P | 0.08 | — | 8.46 |
| Intrinsic viscosity IV | 0.66 | 0.66 | 0.66 |
| Solution haze (%) | 1.1 | 3.4 | 0.7 |
| L value | 72 | 70 | 77 |
| a value | −0.8 | −1.0 | −1.0 |
| b value | 10.3 | 2.0 | 13.8 |
| State of deposit at spinneret | A | C | A |

Phosphorous compound A: phosphorous compound added to titanium catalyst compound Phosphorous compound B: phosphorous compound added to system separate from titanium catalyst compound Amounts in Table are in terms of metal or phosphorous atoms.

Example 21

(Recovering bis(2-hydroxyethyl) terephthalate)

Used polyethylene terephthalate (PET) products including PET bottles were pulverized into flakes, the flakes were mixed with molten bis(2-hydroxyethyl) terephthalate, further heated for preliminary depolymerization, and the obtained preliminarily depolymerized product was subjected to depolymerization in ethylene glycol to form an ethylene glycol solution of the bis(2-hydroxyethyl) terephthalate.

This solution was subjected to filtering out of foreign matter, decoloration with activated carbon, and deionization by ion exchange.

Next, the crude bis(2-hydroxyethyl) terephthalate was separated out of the solution by crystallization, and the separated matter was refined by molecular distillation, thereby yielding a melt of refined bis(2-hydroxyethyl) terephthalate.

This melt was maintained at 120° C., and dropped onto a belt flaker maintained at 25° C. at a speed of 1 drop per second from a dropping orifice such that the weight of each drop was 25 mg, thereby yielding bis(2-hydroxyethyl) terephthalate pellets having a meniscus lens shape with a maximum diameter of 4 mm at the average circumference and a height of 2 mm at the top of the convex face.

(Recovering Terephthalic Acid)

A 500 ml separable flask having 200 parts by mass of ethylene glycol was prepared beforehand, into which were placed 1.5 parts by mass of sodium carbonate and 50 parts by mass of used PET product flakes including PET bottles, and heated to 185° C. while stirring. This was continuously stirred for 4 hours at this temperature, whereby the used PET product flakes were dissolved, and depolymerization was completed. The obtained matter was concentrated by depressurization distilling, and 150 parts by mass of ethylene glycol were recovered as distillate.

0.5 parts by mass of sodium carbonate and 100 parts by mass of methanol were added to the concentrate as an ester interchange reaction catalyst, and stirred at normal pressure for 1 hour at 75° C., carrying out the ester interchange reaction.

The obtained mixture was cooled to 40° C., and filtered with a glass filter. 100 parts by mass of the crude dimethyl terephthalate captured on the filter were placed in methanol, washed by stirring while heating to 40° C., and filtered with a glass filter again. Following this, washing by stirring in methanol was repeated again.

The crude dimethyl terephthalate captured on the filter was placed in a still, subjected to depressurization distillation at a pressure of 6.65 kPa and a reflux ratio of 0.5, thereby obtaining dimethyl terephthalate as a distill.

100 parts by mass of the obtained dimethyl terephthalate were mixed with 200 parts by mass of water, stirred while maintaining at 180° C., and subsequently supplied to a hydrolysis device. The fluid temperature in the hydrolysis device to which the mixture was supplied as maintained at 250° C., and stirred to carry out the hydrolysis, and the methanol generated was distilled out along with the water.

The mass ratio of the terephthalic acid to the water in the terephthalic acid/water slurry was approximately 1 to 1. Also, the total amount of 4-carboxybenzaldehyde, paratoluic acid, benzoic acid, and dimethyl 2-hydroxyterephthalate, was 1 ppm by mass or less as to the terephthalic acid.

Next, 166 parts by mass of the obtained terephthalic acid/water slurry and 4150 parts by mass of ethylene glycol were placed in a centrifuge and mixed. The ratio by mass of the terephthalic acid/water/ethylene glycol was 1:1:50 at the point of being placed therein, and the solvent was removed from the slurry to yield a terephthalic acid cake. The ratio by mass of the terephthalic acid/water/ethylene glycol in the terephthalic acid cake was approximately 83:0.4:14.3.

Ethylene glycol was further added to the cake and mixed, finally yielding a terephthalic acid/ethylene glycol slurry with a mass ratio of 66:34.

(Preparing Catalyst Compound)

Carried out in the same way as with Example 1.

(Producing Polyester Composition)

A polyester composition was obtained in the same way as with Example 1 except for using the bis(2-hydroxyethyl) terephthalate and the terephthalic acid/ethylene glycol slurry obtained as described above as the material for the polyester.

(Melt Spinning, Drawing)

Carried out in the same way as with Example 1, except for using the above-described polyester composition.

TABLE 10

| | Example 21 |
|---|---|
| Titanium compound | chelated titanium citrate compound |
| Amount (ppm by mass) | 10 |
| Phosphorous compound A | Phosphoric acid |
| Amount (ppm by mass) | 8 |
| Phosphorous compound B | Phosphorous compound 1 |
| Amount (ppm by mass) | 5 |
| Manganese compound | Mn acetate |
| Amount (ppm by mass) | 15 |
| Antimony compound | — |
| Amount (ppm by mass) | 0 |
| Ti/P | 0.50 |
| Mn/P | 0.65 |

TABLE 10-continued

| | Example 21 |
|---|---|
| Intrinsic viscosity IV | 0.66 |
| Solution haze (%) | 0.7 |
| L value | 78 |
| a value | −1.1 |
| b value | 0.6 |
| State of deposit at spinneret | A |

Phosphorous compound A: phosphorous compound added to titanium catalyst compound
Phosphorous compound B: phosphorous compound added to system separate from titanium catalyst compound Amounts in Table are in terms of metal or phosphorous atoms.

Examples 22 through 26

(Preparing Catalyst Compound)
Carried out in the same way as with Example 1.

(Producing Polyester Composition)
A polyester composition was obtained in the same way as with Example 1 except for adding cobalt acetate, Solvent Blue 104 (Polysynthren Blue RBL, manufactured by Clariant) (B1), and Solvent Red 135 (Polysynthren Red GFP, manufactured by Clariant) (R1), to the Examples, in the amounts shown in Table 11.

(Melt Spinning, Drawing)
Carried out in the same way as with Example 1, except for using the above-described polyester composition.

TABLE 11

| | Example 22 | Example 23 | Example 24 | Example 25 | Example 26 |
|---|---|---|---|---|---|
| Titanium compound | chelated titanium citrate compound | chelated titanium citrate compound | chelated titanium citrate compound | chelated titanium citrate compound | chelated titanium citrate compound |
| Amount (ppm by mass) | 10 | 10 | 10 | 10 | 10 |
| Phosphorous compound A | Phosphoric acid | Phosphoric acid | Phosphoric acid | Phosphoric acid | Phosphoric acid |
| Amount (ppm by mass) | 8 | 8 | 8 | 8 | 8 |
| Phosphorous compound B | Phosphorous compound 1 | Phosphorous compound 1 | Phosphorous compound 1 | Phosphorous compound 1 | Phosphorous compound 1 |
| Amount (ppm by mass) | 5 | 5 | 5 | 5 | 5 |
| Manganese compound | Mn acetate | Mn acetate | Mn acetate | Mn acetate | Mn acetate |
| Amount (ppm by mass) | 15 | 15 | 15 | 15 | 15 |
| Antimony compound | — | — | — | — | — |
| Amount (ppm by mass) | 0 | 0 | 0 | 0 | 0 |
| Ti/P | 0.50 | 0.50 | 0.50 | 0.50 | 0.50 |
| Mn/P | 0.65 | 0.65 | 0.65 | 0.65 | 0.65 |
| Cobalt compound | Co acetate | Co acetate | Co acetate | Co acetate | Co acetate |
| Amount (ppm by mass) | 30 | 30 | 30 | 5 | 5 |
| Blue organic color tone adjusting agent | B1 | — | B1 | B1 | B1 |
| Amount (ppm by mass) | 4 | 0 | 4 | 8 | 8 |
| Red organic color tone adjusting agent | — | R1 | R1 | — | R1 |
| Amount (ppm by mass) | 0 | 2 | 2 | 0 | 4 |
| Intrinsic viscosity IV | 0.66 | 0.66 | 0.66 | 0.66 | 0.66 |
| Solution haze (%) | 0.7 | 0.8 | 0.8 | 0.8 | 0.8 |
| L value | 75 | 72 | 72 | 72 | 72 |
| a value | −3.0 | 0.7 | −2.0 | −4.5 | −1.2 |
| b value | −3.5 | 1.0 | −3.2 | 0.1 | 0.2 |
| State of deposit at spinneret | A | A | A | A | A |

Phosphorous compound A: phosphorous compound added to titanium catalyst compound
Phosphorous compound B: phosphorous compound added to system separate from titanium catalyst compound Amounts in Table are in terms of metal or phosphorous atoms.

Examples 27 through 29

(Preparing Catalyst Compound)
Carried out in the same way as with Example 1.

(Producing Polyester Composition)
A polyester composition was obtained in the same way as with Example 1 except for changing the amount of titanium dioxide particles added to the amounts shown in Table 12.

(Melt Spinning, Drawing)
Carried out in the same way as with Example 1, except for using the above-described polyester composition.

TABLE 12

|  | Example 27 | Example 28 | Example 29 |
|---|---|---|---|
| Titanium compound | chelated titanium citrate compound | chelated titanium citrate compound | chelated titanium citrate compound |
| Amount (ppm by mass) | 10 | 10 | 10 |
| Phosphorous compound A | phosphoric acid | phosphoric acid | phosphoric acid |
| Amount (ppm by mass) | 8 | 8 | 8 |
| Phosphorous compound B | Phosphorous compound 1 | Phosphorous compound 1 | Phosphorous compound 1 |
| Amount (ppm by mass) | 5 | 5 | 5 |
| Manganese compound | Mn acetate | Mn acetate | Mn acetate |
| Amount (ppm by mass) | 15 | 15 | 15 |
| Antimony compound | — | — | — |
| Amount (ppm by mass) | 0 | 0 | 0 |
| Ti/P | 0.50 | 0.50 | 0.50 |
| Mn/P | 0.65 | 0.65 | 0.65 |
| Amount of titanium dioxide (ppm by mass) | 0.5 | 2.2 | 7.0 |
| Intrinsic viscosity IV | 0.66 | 0.66 | 0.66 |
| Solution haze (%) | 0.7 | 0.7 | 0.7 |
| L value | 75 | 78 | 80 |
| a value | −1.1 | −1.1 | −1.1 |
| b value | 0.6 | 0.5 | 0.4 |
| State of deposit at spinneret | A | A | A |

Phosphorous compound A: phosphorous compound added to titanium catalyst compound
Phosphorous compound B: phosphorous compound added to system separate from titanium catalyst compound
Amounts in Table are in terms of metal or phosphorous atoms except for titanium dioxide.

Example 30

(Preparing Catalyst Compound)

Carried out in the same way as with Example 1.

(Producing Polyester Composition)

100 kg of bis(2-hydroxyethyl) terephthalate was placed in an esterification reaction vat beforehand and maintained at a temperature of 250° C. and a pressure of $1.2 \times 10^5$ Pa, into which was continuously supplied a slurry of 82.5 kg of high-purity terephthalic acid (manufactured by Mitsui Chemicals) and 35.4 kg of ethylene glycol (manufactured by Nihon Shokubai) over a period of 4 hours, and following supplying, esterification reaction was performed for 1 hour while distilling out water.

Next, 101.5 kg of the esterification reaction product was transported to a copolymerization reaction vat.

Next, 5 g of silicon (TSF433 manufactured by GE Toshiba Silicones) was added into the copolymerization reaction vat to which the esterification reaction product was transported.

Next, an ethylene glycol solution of 11.5 g of cobalt acetate (30 ppm by mass in terms of cobalt atoms as to the target production amount of polyester), 15 g of manganese acetate (33 ppm by mass in terms of manganese atoms as to the target production amount of polyester), 75 g of pentaerithritol-tetrakis (3-(3,5-di-t-butyl-4-hydroxyphenol) propionate) (Irganoxs 1010, manufactured by Ciba-Geigy), 45 g of lithium acetate, and 0.4 g of B1 as a blue color tone adjusting agent, was added.

Also, the above catalyst compound in terms of titanium atoms was added so as to be 10 ppm by mass as to the target production amount of polyester, as well as an ethylene glycol slurry of the phosphorous compound 1 being added so as to be 70 ppm by mass (7 ppm by mass in terms of phosphorous atoms) as to the target production amount of polyester.

After stirring for 5 minutes, 1 kg of polyethylene glycol (manufactured by Sanyo Chemical Industries, Ltd.) having a number average molecular weight of 4000 was added.

After stirring another 5 minutes, an ethylene glycol solution of hydroxyethylester 5-sodium sulfoisophthalate (ES-740, manufactured by Takemoto Oil & Fat) was added so as to be a 1.78 mol % isophthal component as to the acid component of the polyester.

Next, following stirring for 5 minutes, an ethylene glycol slurry of titanium dioxide particles was added so as to be 0.07% by mass to the target production amount of polyester in terms of titanium dioxide particles as to the target production amount of polyester, the low polymer was stirred at 30 rpm while gradually raising the temperature of the reactive system from 250° C. to 290° C. and lowering the pressure to 40 Pa. The speed of increasing temperature and speed of reducing pressure were both adjusted so as to reach the final temperature and final pressure in 60 minutes.

Stirring was continued at 30 rpm, and at the point that a predetermined stirring torque was reached, the reactive system was subjected to nitrogen purging and returned to normal pressure, thereby stopping the polymerization reaction, and discharged into cold water in strands and immediately cut so as to obtain polyethylene terephthalate pellets. The time from starting pressure reduction to reaching the predetermined stirring torque was 3 hours.

The intrinsic viscosity of the obtained polymer was 0.68, the color tone was L=72, a=−2.5, and b=4.5, and the solution haze was 0.7%. Also confirmed by measurement was that the amount of titanium atoms originating from the titanium catalyst measured from the polymer was 10 ppm by mass, the amount of phosphorous atoms contained was 13 ppm by mass, Ti/P was 0.50, and the amount of antimony atoms contained was 0 ppm by mass.

(Melt Spinning, Drawing)

The obtained polyester was dried, supplied to a spinning machine, molten at 285° C. in a melter, measured with a gear pump, discharged at 295° C. from a spinning pack, and taken up at a speed of 1000 m/minute. The obtained undrawn strand was drawn to 2.8 times at 80° C., and then subjected to thermal setting with a 125° C. roller, thereby obtaining a 75 denier (83 dtex) 36 filament drawn yarn.

There was hardly any deposit around the spinneret and increased filter pressure when spinning, and there was hardly any strand breakage when drawing. That is, Example 30 was a polymer with excellent formation workability.

Also, the dye exhaustion percentage was 62%, exhibiting excellent dyeing properties.

Examples 31 through 36

(Preparing Catalyst Compound)

Carried out in the same way as with Example 1.

(Producing Polyester Composition)

A polyester composition was obtained in the same way as with Example 30 except for changing the amount of the isophthalic acid component having the metal sulfonate group added, and the number average molecular weight of the polyethylene glycol component added, as indicated in Tables 13 and 14.

(Melt Spinning, Drawing)

Carried out in the same way as with Example 30, except for using the above-described polyester composition.

TABLE 13

|  | Example 30 | Example 31 | Example 32 |
|---|---|---|---|
| Isophthalic acid component having metal sulfonate group (mol %) | 1.78 | 0.1 | 10.0 |
| number average molecular weight of the polyethylene glycol component | 4000 | 4000 | 4000 |
| Amount (mass %) | 1 | 1 | 1 |
| Antimony compound | — | — | — |
| Amount (ppm by mass) | 0 | 0 | 0 |
| Titanium compound | chelated citric acid | chelated citric acid | chelated citric acid |
| Amount (ppm by mass) | 10 | 10 | 10 |
| Phosphorous compound A | phosphoric acid | phosphoric acid | phosphoric acid |
| Amount (ppm by mass) | 8 | 8 | 8 |
| Phosphorous compound B | Phosphorous compound 1 | Phosphorous compound 1 | Phosphorous compound 1 |
| Amount (ppm by mass) | 7 | 7 | 7 |
| Ti/P | 0.5 | 0.5 | 0.5 |
| Manganese compound | Manganese acetate | Manganese acetate | Manganese acetate |
| Amount (ppm by mass) | 33 | 33 | 33 |
| Cobalt compound | Cobalt acetate | Cobalt acetate | Cobalt acetate |
| Amount (ppm by mass) | 30 | 30 | 30 |
| Mn/P | 1.24 | 1.24 | 1.24 |
| Blue organic color tone adjusting agent | B1 | B1 | B1 |
| Amount (ppm by mass) | 4 | 4 | 4 |
| Red organic color tone adjusting agent | — | — | — |
| Amount (ppm by mass) | 0 | 0 | 0 |
| Amount of titanium dioxide (% by mass) | 0.07 | 0.07 | 0.07 |
| Intrinsic viscosity IV | 0.68 | 0.68 | 0.68 |
| Solution haze (%) | 0.7 | 0.2 | 1.4 |
| L value | 72 | 74 | 71 |
| a value | −2.5 | −2.5 | −2.5 |
| b value | 4.5 | 3.0 | 6.5 |
| Strength (cN/dtex) | 4.1 | 4.1 | 3.8 |
| State of deposit at spinneret | A | A | B |
| Dye exhaustion (%) | 62 | 41 | 78 |

Phosphorous compound A: phosphorous compound added to titanium catalyst compound
Phosphorous compound B: phosphorous compound added to system separate from titanium catalyst compound Amounts in Table are in terms of metal or phosphorous atoms except for titanium dioxide.

TABLE 14

|  | Example 33 | Example 34 | Example 35 | Example 36 |
|---|---|---|---|---|
| Isophthalic acid component having metal sulfonate group (mol %) | 1.78 | 1.78 | 1.78 | 1.78 |
| number average molecular weight of the polyethylene glycol component | 400 | 6000 | 4000 | 4000 |

TABLE 14-continued

|  | Example 33 | Example 34 | Example 35 | Example 36 |
|---|---|---|---|---|
| Amount (mass %) | 1 | 1 | 0.1 | 5.0 |
| Antimony compound | — | — | — | — |
| Amount (ppm by mass) | 0 | 0 | 0 | 0 |
| Titanium compound | chelated citric acid | chelated citric acid | chelated citric acid | chelated citric acid |
| Amount (ppm by mass) | 10 | 10 | 10 | 10 |
| Phosphorous compound A | phosphoric acid | phosphoric acid | Phosphoric acid | phosphoric acid |
| Amount (ppm by mass) | 8 | 8 | 8 | 8 |
| Phosphorous compound B | Phosphorous compound 1 | Phosphorous compound 1 | Phosphorous compound 1 | Phosphorous compound 1 |
| Amount (ppm by mass) | 7 | 7 | 7 | 7 |
| Ti/P | 0.5 | 0.5 | 0.5 | 0.5 |
| Manganese compound | Manganese acetate | Manganese acetate | Manganese acetate | Manganese acetate |
| Amount (ppm by mass) | 33 | 33 | 33 | 33 |
| Cobalt compound | Cobalt acetate | Cobalt acetate | Cobalt acetate | Cobalt acetate |
| Amount (ppm by mass) | 30 | 30 | 30 | 30 |
| Mn/P | 1.24 | 1.24 | 1.24 | 1.24 |
| Blue organic color tone adjusting agent | B1 | B1 | B1 | B1 |
| Amount (ppm by mass) | 4 | 4 | 4 | 4 |
| Red organic color tone adjusting agent | — | — | — | — |
| Amount (ppm by mass) | 0 | 0 | 0 | 0 |
| Amount of titanium dioxide (% by mass) | 0.07 | 0.07 | 0.07 | 0.07 |
| Intrinsic viscosity IV | 0.68 | 0.68 | 0.68 | 0.68 |
| Solution haze (%) | 0.7 | 0.9 | 0.6 | 0.8 |
| L value | 72 | 73 | 73 | 72 |
| a value | −2.5 | −2.5 | −2.5 | −2.5 |
| b value | 3.4 | 5.9 | 3.3 | 6.7 |
| Strength (cN/dtex) | 4.1 | 4.1 | 4.1 | 3.8 |
| State of deposit at spinneret | A | B | A | B |
| Dye exhaustion (%) | 42 | 68 | 41 | 76 |

Phosphorous compound A: phosphorous compound added to titanium catalyst compound Phosphorous compound B: phosphorous compound added to system separate from titanium catalyst compound Amounts in Table are in terms of metal or phosphorous atoms except for titanium dioxide.

Examples 37 through 43

(Preparing Catalyst Compound)

Carried out in the same way as with Example 1.

(Producing Polyester Composition)

A polyester composition was obtained in the same way as with Example 30 except for changing the amount of the isophthalic acid component having the metal sulfonate group added, and the number average molecular weight of the polyethylene glycol component added, as indicated in Tables 15 and 16, and also the changing amount of adding the titanium dioxide particles to 1.5% by mass in terms of titanium dioxide particles as to the target production amount of the polyester.

(Melt Spinning, Drawing)

Carried out in the same way as with Example 30, except for using the above-described polyester composition.

TABLE 15

|  | Example 37 | Example 38 | Example 39 |
|---|---|---|---|
| Isophthalic acid component having metal sulfonate group (mol %) | 1.78 | 0.1 | 10.0 |
| number average molecular weight of the polyethylene glycol component | 4000 | 4000 | 4000 |
| Amount (mass %) | 1 | 1 | 1 |
| Antimony compound | — | — | — |
| Amount (ppm by mass) | 0 | 0 | 0 |
| Titanium compound | chelated citric acid | chelated citric acid | chelated citric acid |
| Amount (ppm by mass) | 10 | 10 | 10 |
| Phosphorous compound A | phosphoric acid | phosphoric acid | phosphoric acid |
| Amount (ppm by mass) | 8 | 8 | 8 |
| Phosphorous compound B | Phosphorous compound 1 | Phosphorous compound 1 | Phosphorous compound 1 |
| Amount (ppm by mass) | 7 | 7 | 7 |
| Ti/P | 0.5 | 0.5 | 0.5 |

TABLE 15-continued

|  | Example 37 | Example 38 | Example 39 |
|---|---|---|---|
| Manganese compound | Manganese acetate | Manganese acetate | Manganese acetate |
| Amount (ppm by mass) | 33 | 33 | 33 |
| Cobalt compound | Cobalt acetate | Cobalt acetate | Cobalt acetate |
| Amount (ppm by mass) | 30 | 30 | 30 |
| Mn/P | 1.24 | 1.24 | 1.24 |
| Blue organic color tone adjusting agent | B1 | B1 | B1 |
| Amount (ppm by mass) | 4 | 4 | 4 |
| Red organic color tone adjusting agent | — | — | — |
| Amount (ppm by mass) | 0 | 0 | 0 |
| Amount of titanium dioxide (% by mass) | 1.5 | 1.5 | 1.5 |
| Intrinsic viscosity IV | 0.68 | 0.68 | 0.68 |
| Solution haze (%) | 0.7 | 0.2 | 1.4 |
| L value | 74 | 75 | 73 |
| a value | −2.3 | −2.2 | −2.4 |
| b value | 3.5 | 2.8 | 6.1 |
| Strength (cN/dtex) | 4.1 | 4.1 | 3.9 |
| State of deposit at spinneret | A | A | B |
| Dye exhaustion (%) | 65 | 42 | 79 |

Phosphorous compound A: phosphorous compound added to titanium catalyst compound
Phosphorous compound B: phosphorous compound added to system separate from titanium catalyst compound Amounts in Table are in terms of metal or phosphorous atoms except for titanium dioxide.

TABLE 16

|  | Example 40 | Example 41 | Example 42 | Example 43 |
|---|---|---|---|---|
| Isophthalic acid component having metal sulfonate group (mol %) | 1.78 | 1.78 | 1.78 | 1.78 |
| number average molecular weight of the polyethylene glycol component | 400 | 6000 | 4000 | 4000 |
| Amount (mass %) | 1 | 1 | 0.1 | 5.0 |
| Antimony compound | — | — | — | — |
| Amount (ppm by mass) | 0 | 0 | 0 | 0 |
| Titanium compound | chelated citric acid | chelated citric acid | chelated citric acid | chelated citric acid |
| Amount (ppm by mass) | 10 | 10 | 10 | 10 |
| Phosphorous compound A | phosphoric acid | phosphoric acid | phosphoric acid | phosphoric acid |
| Amount (ppm by mass) | 8 | 8 | 8 | 8 |
| Phosphorous compound B | Phosphorous compound 1 | Phosphorous compound 1 | Phosphorous compound 1 | Phosphorous compound 1 |
| Amount (ppm by mass) | 7 | 7 | 7 | 7 |
| Ti/P | 0.5 | 0.5 | 0.5 | 0.5 |
| Manganese compound | Manganese acetate | Manganese acetate | Manganese acetate | Manganese acetate |
| Amount (ppm by mass) | 33 | 33 | 33 | 33 |
| Cobalt compound | Cobalt acetate | Cobalt acetate | Cobalt acetate | Cobalt acetate |
| Amount (ppm by mass) | 30 | 30 | 30 | 30 |
| Mn/P | 1.24 | 1.24 | 1.24 | 1.24 |
| Blue organic color tone adjusting agent | B1 | B1 | B1 | B1 |
| Amount (ppm by mass) | 4 | 4 | 4 | 4 |
| Red organic color tone adjusting agent | — | — | — | — |
| Amount (ppm by mass) | 0 | 0 | 0 | 0 |
| Amount of titanium dioxide (% by mass) | 1.5 | 1.5 | 1.5 | 1.5 |
| Intrinsic viscosity IV | 0.68 | 0.68 | 0.68 | 0.68 |
| Solution haze (%) | 0.7 | 0.9 | 0.6 | 0.8 |
| L value | 74 | 75 | 75 | 74 |
| a value | −2.3 | −2.2 | −2.3 | −2.4 |
| b value | 3.3 | 5.4 | 3.1 | 6.5 |
| Strength (cN/dtex) | 4.1 | 4.1 | 4.0 | 3.9 |

TABLE 16-continued

| | Example 40 | Example 41 | Example 42 | Example 43 |
|---|---|---|---|---|
| State of deposit at spinneret | A | B | A | B |
| Dye exhaustion (%) | 45 | 69 | 46 | 78 |

Phosphorous compound A: phosphorous compound added to titanium catalyst compound
Phosphorous compound B: phosphorous compound added to system separate from titanium catalyst compound
Amounts in Table are in terms of metal or phosphorous atoms except for titanium-dioxide.

Example 44

(Preparing Catalyst Compound)
Carried out in the same way as with Example 1.

(Producing Polyester Composition for Core Component)
A polyester composition was obtained in the same way as with Example 1, and used as the core component of a core-sheath compound fiber.

(Producing Polyester Composition for Sheath Component)
A polyester composition was obtained in the same way as the polyester composition for the core component above, except for using 90 kg of terephthalic acid and 10 kg of isophthalic acid (manufactured by Mitsui Chemicals, Inc.) as a dicarboxylic acid, and setting the amount of titanium dioxide particles added so as to be 0.1% by mass as to the target production amount of the polyester, and this obtained polyester composition was used for the sheath component of a core-sheath compound fiber.
The IV of the obtained polyester for the sheath component was 0.63, and the melting point was 257° C. Also, the amount of titanium atoms contained owing to the titanium catalyst was configured by measurement of the polymer to be 10 ppm by mass.

(Melt Spinning and Forming Nonwoven Cloth)
The above core component and sheath component were each molted at 280° C., 240 g/minute for the core component and 60 g/minute for the sheath component were discharged from a core-sheath compound fiber spinneret having 200 orifices 0.5 mm in diameter, the spun filaments were sucked at high speed with an air sucker pressure of 0.54 MPa and caused to collide into a collision plate along with the air flow so as to disintegrate the filaments, which were collected on a net conveyer adjusted such that the sheet weight was 50 g/m². Subsequently, part of this was subjected to thermal pressurization by an embossing roller heated to 235° C., thereby obtaining a nonwoven cloth. The state of strand breakage in the process of manufacturing the nonwoven cloth was observed for 180 minutes but not a single strand breakage was observed, meaning that operating properties were excellent.
The obtained nonwoven cloth had an excellent CV value of 3.2%.

Examples 45 and 46

(Preparing Catalyst Compound)
Carried out in the same way as with Example 1.

(Producing Polyester Composition for Core Component),
A polyester composition was obtained in the same way as with Example 1, and used as the core component of a core-sheath compound fiber.

(Producing Polyester Composition for Sheath Component)
A polyester composition was obtained in the same way as with Example 44 except for changing the amount of isophthalic acid as indicated in Table 17 for each Example.

(Melt Spinning and Forming Nonwoven Cloth)
Carried out in the same way as with Example 44 except for using the above polyester composition.

TABLE 17

| Sheath component | Example 44 | Example 45 | Example 46 |
|---|---|---|---|
| Copolymerization component | Isophthalic acid | Isophthalic acid | Isophthalic acid |
| Amount added (mol %) | 0.1 | 10 | 20 |
| Titanium compound | chelated titanium citrate compound | chelated titanium citrate compound | chelated titanium citrate compound |
| Amount (ppm by mass) | 10 | 10 | 10 |
| Phosphorous compound A | phosphoric acid | phosphoric acid | phosphoric acid |
| Amount (ppm by mass) | 8 | 8 | 8 |
| Phosphorous compound B | Phosphorous compound 1 | Phosphorous compound 1 | Phosphorous compound 1 |
| Amount (ppm by mass) | 5 | 5 | 5 |
| Manganese compound | Mn acetate | Mn acetate | Mn acetate |
| Amount (ppm by mass) | 15 | 15 | 15 |
| Antimony compound | — | — | — |
| Amount (ppm by mass) | 0 | 0 | 0 |
| Ti/P | 0.50 | 0.50 | 0.50 |
| Mn/P | 0.65 | 0.65 | 0.65 |
| Intrinsic viscosity IV | 0.63 | 0.62 | 0.61 |
| Melting point (° C.) | 257 | 227 | 210 |
| Solution haze (%) | 0.8 | 0.8 | 0.8 |

Phosphorous compound A: phosphorous compound added to titanium catalyst compound
Phosphorous compound B: phosphorous compound added to system separate from titanium catalyst compound Amounts in Table are in terms of metal or phosphorous atoms.

TABLE 18

|  | Example 44 | Example 45 | Example 46 |
|---|---|---|---|
| Core component ratio (%) | 80 | 80 | 80 |
| CV value (%) | 3.2 | 3.2 | 4.1 |
| Strand breakage (times/180 minutes) | 0 | 0 | 0 |

Example 47

(Preparing Catalyst Compound)

Carried out in the same way as with Example 1.

(Producing Polyester Composition)

A polyester composition was obtained in the same way as with Example 1 except for omitting addition of the titanium dioxide particles and setting the torque value such that the IV was 0.72.

Further, the polyester composition as subjected to preliminary drying at 160° C. for 5 hours, then solid-phase polymerized under conditions of 225° C. and a pressure of 40 Pa, thereby yielding a chip of a polyester composition having an IV of 1.27.

(Melt Spinning, Drawing)

The a polyester composition having an IV of 1.27 was spun using an extruder type spinning machine. Filaments discharged from discharge orifices 0.6 mm in diameter were subjected to cold removal in a heating cylinder 300 mm in length at 300° C., then hardened by cooling in a breeze of 18° C. and taken up at a speed of 2000 m/minute. The undrawn strands thus obtained were subjected to change in drawing and relaxation at a drawing temperature of 85° C. and heat treatment temperature of 240° C., thereby yielding a 1000 dtex 240 filament drawn yarn.

There was hardly any filter pressure increase during spinning. Further breakage hardly occurred at all when drawing, meaning that yarn formation properties were excellent.

The IV measured from the polyester fiber was 1.02., Also, the solution haze measured from the drawn yarn was 0.6.

A processed cord formed from this drawn yarn had excellent strength of 7.1 cN/dtex, and fatigue resistance was also superb to that of conventional products.

TABLE 19

|  | Example 47 |
|---|---|
| Titanium compound | chelated citric acid |
| Amount (ppm by mass) | 10 |
| Phosphorous compound A | phosphoric acid |
| Amount (ppm by mass) | 8 |
| Phosphorous compound B | Phosphorous compound 1 |
| Amount (ppm by mass) | 5 |
| Manganese compound | Manganese acetate |
| Amount (ppm by mass) | 15 |
| Antimony compound | — |
| Amount (ppm by mass) | 0 |
| Ti/P | 0.50 |
| Mn/P | 0.65 |
| Intrinsic viscosity IV | 1.02 |
| Solution haze (%) | 0.6 |
| Strength (cN/dtex) | 8.5 |
| Elongation | 13.7 |
| T·E$^{1/2}$ | 31.5 |
| Intermediate elongation (%) | 5.6 |
| Dry-heat shrinkage (%) | 4.1 |
| Dimensional stability (%) | 9.7 |
| Strand breakage (times/180 minutes) | 0 |
| Processed cord strength (cN/dtex) | 7.1 |
| Fatigue endurance (GY fatigue life) | AA |

Phosphorous compound A: phosphorous compound added to titanium catalyst compound
Phosphorous compound B: phosphorous compound added to system separate from titanium catalyst compound Amounts in Table are in terms of metal or phosphorous atoms.

Example 48

(Preparing Catalyst Compound)

Carried out in the same way as with Example 1.

(Producing Polyester Composition)

A polyester composition was obtained in the same way as with Example 1 except for omitting addition of the titanium dioxide particles and setting the torque value such that the IV was 0.72.

(Melt Spinning, Drawing)

The obtained polyester was dried and then supplied to a spinning machine, molten at 290° C. with a melter, measured with a gear pump, discharged at 300° C. from a spinning pack, and taken up at a speed of 1000 m/minute. The obtained undrawn strand was drawn to 3.2 times at 90° C., further drawn at 105° C. to 1.6 times, and then subjected to thermal setting with a 210° C. hot roller, thereby obtaining a 78 dtex 24 filament drawn yarn.

There was hardly any deposit around the spinneret and increased filter pressure when spinning, and there was hardly any strand breakage when drawing. That is, Example 48 was a polymer with excellent formation workability.

TABLE 20

|  | Example 48 |
|---|---|
| Titanium compound | chelated citric acid |
| Amount (ppm by mass) | 10 |
| Phosphorous compound A | phosphoric acid |
| Amount (ppm by mass) | 8 |
| Phosphorous compound B | Phosphorous compound 1 |
| Amount (ppm by mass) | 5 |
| Manganese compound | Manganese acetate |
| Amount (ppm by mass) | 15 |
| Antimony compound | — |
| Amount (ppm by mass) | 0 |
| Ti/P | 0.50 |
| Mn/P | 0.65 |
| Intrinsic viscosity IV | 0.72 |
| Solution haze (%) | 0.7 |
| L value | 77 |
| a value | −1.1 |

TABLE 20-continued

|  | Example 48 |
|---|---|
| b value | 0.5 |
| State of deposit at spinneret | A |
| Strength (cN/dtex) | 7.8 |
| Elongation (%) | 22 |
| First drawing | 3.2 times |
| Second drawing | 1.6 times |
| Drawn to | 5.12 times |
| Strand breakage in drawing (%) | 0.7 |

Phosphorous compound A: phosphorous compound added to titanium catalyst compound Phosphorous compound B: phosphorous compound added to system separate from titanium catalyst compound Amounts in Table are in terms of metal or phosphorous atoms.

What is claimed is:

1. A polyester production method comprising:
adding to a polyester reaction system for producing a polyester containing primarily ethylene terephthalate units,
a titanium compound having a radical selected from a carbonyl group, a carboxyl group, or an ester group, and
a phosphorous compound containing a six-membered ring structure or higher which includes a phosphorous atom in said ring and having a structure of Formula (I)

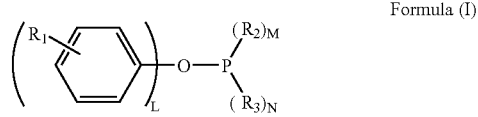

Formula (I)

in which $R_1$ represents hydrogen, a hydrocarbon radical comprising 1 to 50 carbon atoms, a hydroxyl group, or a hydrocarbon radical comprising 1 to 50 carbon atoms and including an alkoxy group, of which two or more may be included with regard to the benzene ring; $R_2$ and $R_3$ independently represent a hydrocarbon radical comprising 1 to 50 carbon atoms, a hydroxyl group, or a hydrocarbon radical comprising 1 to 50 carbon atoms and including an alkoxy group, and may be an alkoxy group of —$OR_2$ or —$OR_3$ as to the phosphorous atom; L, M and N are 1; and $R_2$ and $R_3$ form a ring.

2. A polyester production method according to claim 1 wherein said titanium compound includes a radical selected from a group of functional groups represented by the following Formulas (II) through (VI);

Formula (II)

Formula (III)

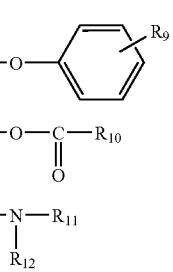

Formula (IV)

Formula (V)

Formula (VI)

in which $R_4$ through $R_{12}$ independently represent hydrogen, a hydrocarbon radical comprising 1 to 30 carbon atoms, or a hydrocarbon radical comprising 1 to 30 carbon atoms and including an alkoxy group, a hydroxyl group, a carbonyl, group, an acetyl group, a carboxyl group, an ester group, or an amino group.

3. A polyester production method according to claim 2 wherein said titanium compound includes a radical selected from a group of functional groups represented by the Formulas (II) through (IV);
in which $R_4$ through $R_9$ independently represent a hydrocarbon radical comprising 1 to 30 carbon atoms and including a carbonyl group, a carboxyl group, or an ester group.

4. A polyester production method according to claim 3 wherein said phosphorous compound includes that represented by Formula (VII);

Formula (VII)

in which $R_{13}$ and $R_{14}$ independently correspond to $R_1$ in Formula (I).

5. A polyester production method according to claim 1 wherein 0.5 to 150 ppm of titanium compound is added as to the amount of polyester to be generated, in terms of titanium atoms.

6. A polyester production method according to claim 1 wherein 0.1 to 400 ppm of phosphorous compound is added as to the amount of polyester to be generated, in terms of phosphorous atoms.

7. A polyester production method according to claim 1 wherein the ratio of addition of titanium compound and phosphorous compound is 0.1 to 20 in terms of molecular ratio Ti/P of titanium atoms and phosphorous atoms.

8. A polyester production method according to claim 1 wherein 1 to 400 ppm of a manganese compound is added as to the amount of polyester to be generated, in terms of manganese atoms, wherein the ratio of addition of manganese compound as to the phosphorous compound is 0.1 to 200 in terms of molecular ratio Mn/P of manganese atoms and phosphorous atoms.

9. A polyester production method according to claim 1 wherein a blue organic color adjusting agent and/or a red organic color adjusting agent is added.

10. A polyester production method according to claim 1 wherein polymerized polyester which has then been depolymerized is used as a material.

* * * * *